(12) United States Patent
Hansson et al.

(10) Patent No.: US 7,461,817 B1
(45) Date of Patent: Dec. 9, 2008

(54) CARGO PARACHUTE RELEASE APPARATUS, SYSTEM AND METHOD

(75) Inventors: Mark G. Hansson, Saint Peterburg, FL (US); Ralph E. Robertson, Jr., Largo, FL (US); Felix Nunez, Largo, FL (US)

(73) Assignee: Conax Florida Corporation, St. Petersburg, FL (US)

( * ) Notice: Subject to any disclaimer, the term of this patent is extended or adjusted under 35 U.S.C. 154(b) by 0 days.

(21) Appl. No.: 11/471,757

(22) Filed: Jun. 21, 2006

Related U.S. Application Data

(60) Provisional application No. 60/692,635, filed on Jun. 21, 2005.

(51) Int. Cl.
*B64D 17/38* (2006.01)

(52) U.S. Cl. .................................. 244/151 B

(58) Field of Classification Search ................ 244/142, 244/151 R, 151 A, 151 B, 152; 446/49; 24/573.6, 24/603
See application file for complete search history.

(56) References Cited

U.S. PATENT DOCUMENTS

| | | | | |
|---|---|---|---|---|
| 4,253,628 A | * | 3/1981 | Marek | 244/151 A |
| 4,562,623 A | * | 1/1986 | Jeswine | 24/579.11 |
| 4,659,042 A | * | 4/1987 | Friddle et al. | 244/142 |
| 4,858,856 A | * | 8/1989 | Cloth | 244/149 |
| 5,407,375 A | * | 4/1995 | Johnson | 446/52 |
| 6,257,524 B1 | * | 7/2001 | Fitzgerald et al. | 244/142 |
| 6,930,611 B1 | * | 8/2005 | Van Druff et al. | 340/644 |
| 6,942,185 B2 | * | 9/2005 | Preston | 244/151 B |

* cited by examiner

*Primary Examiner*—Michael R Mansen
*Assistant Examiner*—Valentina Xavier
(74) *Attorney, Agent, or Firm*—Hodgson Russ LLP

(57) ABSTRACT

A cargo parachute release apparatus comprising an assembly plate and a hinged member that is hinged to the assembly plate with a hinge pin. Parachute riser attachment components are positioned between the assembly plate and hinged member when the hinged member is in the closed position. An electronic package assembly having a microprocessor having predetermined parameters is provided, and the electronic package assembly has horizontal and vertical accelerometers and a strain gage for collecting data and sending the data to the microprocessor for processing. When the incoming data matches the predetermined parameters that indicate impact has been made, the microprocessor sends a firing signal to an electro-explosive device to detonate which causes the hinged member to open and release the parachute. The cargo is not dragged along the ground, tipped over or otherwise damaged.

13 Claims, 22 Drawing Sheets

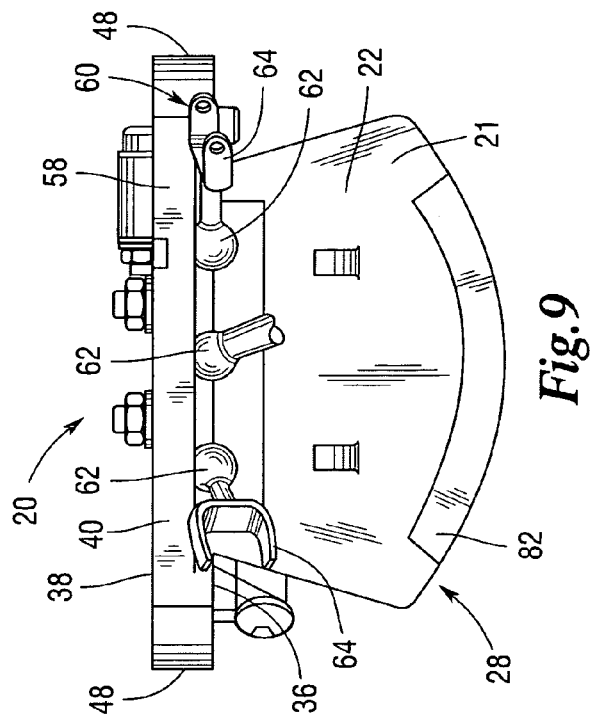
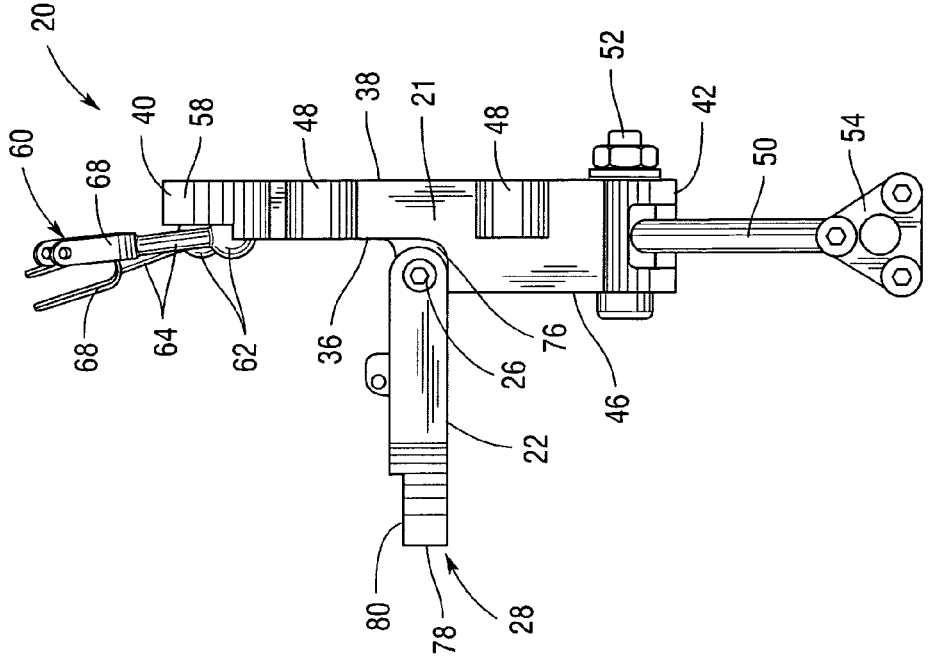

CARGO PARACHUTE RELEASE APPARATUS, SYSTEM AND METHOD

CROSS REFERENCE TO RELATED APPLICATION

This application claims priority based on U.S. Provisional patent application No. 60/692,635 filed Jun. 21, 2005 to Hansson et al., for a Cargo Parachute Release Apparatus, System and Method which is incorporated herein by reference.

BACKGROUND

Some military cargo planes are designed so that cargo can be dropped out of them while the plane is airborne. The cargo is secured on pallets and extracted from the plane. As the cargo falls, parachutes deploy to slow the descent. At some point after the cargo impacts land, the parachutes must detach, otherwise the parachutes could drag the cargo or tip the cargo over.

Therefore, mechanical devices are used to release the parachutes from the cargo. A significant problem exists with the current systems because they have an unacceptable success rate, because parachuted drops of cargo end up tipping over upon impact and roll on the ground, which can damage and/or ruin the cargo.

Thus, what is needed is a better apparatus for releasing parachutes from cargo.

SUMMARY

The cargo parachute release apparatus, system, and method of this invention is capable of supporting about 25,000 pounds of cargo. Two individual cargo parachute release apparatuses can be connected or "piggybacked" to one another, so that cargo loads of up to about 50,000 pounds can be supported. The cargo loads are placed on and secured to pallets, and can include food, medicine, and heavy vehicles.

In a preferred embodiment, the cargo parachute release apparatus of the invention comprises an assembly plate and a hinged member that are connected to one another by a hinge pin, such that the hinged member is movable between an open or release position and a closed position. The hinged member has formations having bores. There is an electronic assembly or electronic package assembly (hereinafter EPA) from which extend release pins, and the EPA is fitted in a recess formed in the assembly plate. The hinged member is moved into a closed position, such that the release pins extend from the EPA and are received in the bores in the formations. The hinged member is moved into the closed position when the cargo parachute release is being assembled. In addition, when the hinged member is in the closed position, parachute riser attachment components that connect to the parachute are positioned in curved recesses that are formed in the assembly plate and the hinged member, respectively.

The assembly plate has a recess into which is fitted the EPA. One of the functions of the EPA is to determine when the parachute should release from the cargo parachute apparatus. This is accomplished by a circuit assembly having a microprocessor, vertical and horizontal accelerometers, a flash memory chip, a network of resistors forming a strain gage, a firing circuit, a voltage supervisor circuit and a voltage regulator network. There is also an electro-explosive device (hereinafter EED) positioned in the EPA. When the cargo is pushed from the aircraft the strain gage detects a voltage signal acts and this acts to "wake up" or activate the microprocessor to begin operation of the electrical system. The processor thereafter begins to receive data from the vertical and horizontal accelerometers to sense the vertical and horizontal movement of the descending parachute. The vertical and horizontal accelerometers continuously send data to the microprocessor for processing and evaluation. The microprocessor sends the incoming data to a flash memory for storage after processing.

The microprocessor continues to monitor and process the incoming data from the vertical and horizontal accelerometers until the data indicates that the cargo has impacted with land or water. In particular, the microprocessor has stored predetermined parameters and when the incoming data matches the predetermined parameters, that is, the impact signal is detected, the microprocessor sends a command signal to the firing circuit, and the firing circuit activates or fires the EED.

The EPA includes a spring that forces on the release pins so that the release pins extend from the EPA and into the bores in the formations in the hinged member. When the EED fires, the gas causes the release pins retract into the housing and the spring compresses, and the release pins are thereafter held in the retracted position by pin retainers. When the release pins retract they rapidly withdraw out of the bores in the formations in the hinged member. The hinged member is thus allowed to open, and when this happens the parachute attachment riser components release and the parachute(s) detaches from the cargo.

When the parachute is dropped from a plane the parachute deploys, which causes a strain to be imparted through the parachute riser attachment causing the EPA to arm. Vertical and horizontal accelerometers measure the rate and angle of descent and the strain gage measures the tensile load on the parachute attachment riser components. The microprocessor constantly compares this incoming data with a set of stored predetermined parameters. When the measured strain data and data inputs from the vertical and horizontal accelerometers match the predetermined parameters stored in the microprocessor, the microprocessor sends a firing signal to the firing circuit which causes an explosive device to detonate. The release pins retract from the bores in the hinged member, and the hinged member opens and the parachute detaches.

In another embodiment, there can be a pin, pull pin or release pin that connects to a switch. When the cargo is extracted from the plane and dropped, the arming pin is pulled and this closes the switch causing current to flow in the circuit assembly. Thus, the pulling the arming pin when the cargo is dropped activates the EPA. In addition, in such an embodiment the strain gage is not required, because the EPA is armed when the arming pin is pulled. Thus the EPA can be make without the strain gage.

In yet another embodiment, the EPA can have both the strain gage as described above, and the arming pin and switch which will provide for a degree of redundancy to arm the EPA.

Thus, the with the present invention the cargo is advantageously not damaged, because the parachutes are detached at a the precise moment when the predetermined parameters are met, which prevents any significant damage to the cargo. The problems associated with wind dragging and ruining cargo are thus advantageously eliminated by the invention.

BRIEF DESCRIPTION OF THE FIGURES

At the outset, it is noted that like reference numbers are intended to identify the same structure, portions, or surfaces consistently throughout the figures.

FIG. 8 is a right side elevational view of the cargo parachute release apparatus wherein the hinged member is in the open position.

FIG. 9 is a top plan view of the cargo parachute release apparatus wherein the hinged member is in the open position.

DETAILED DESCRIPTION

Figure 2:
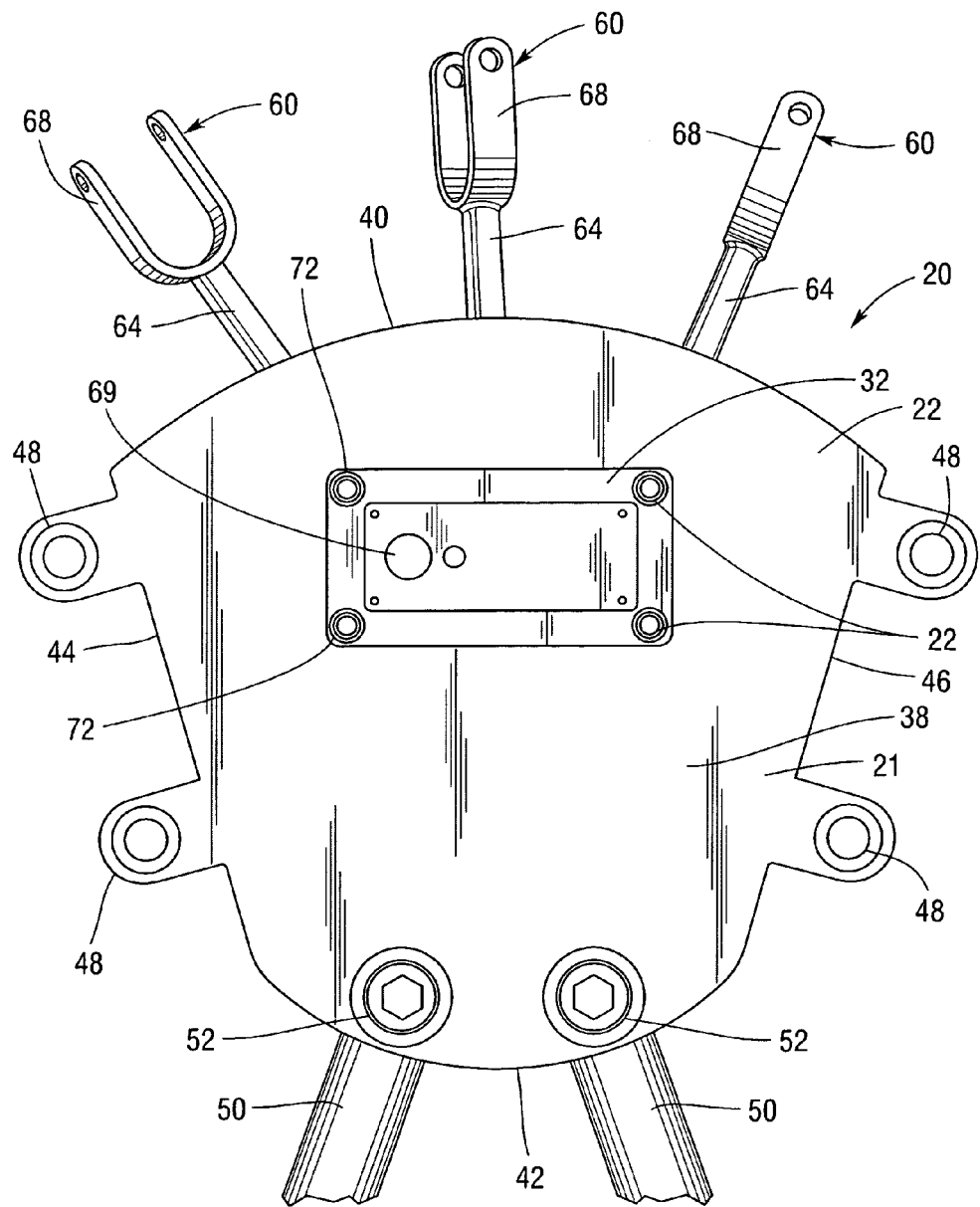
FIG. 2 is a rear elevational view, partly in broken line, of the cargo parachute release apparatus.
Figure 3:
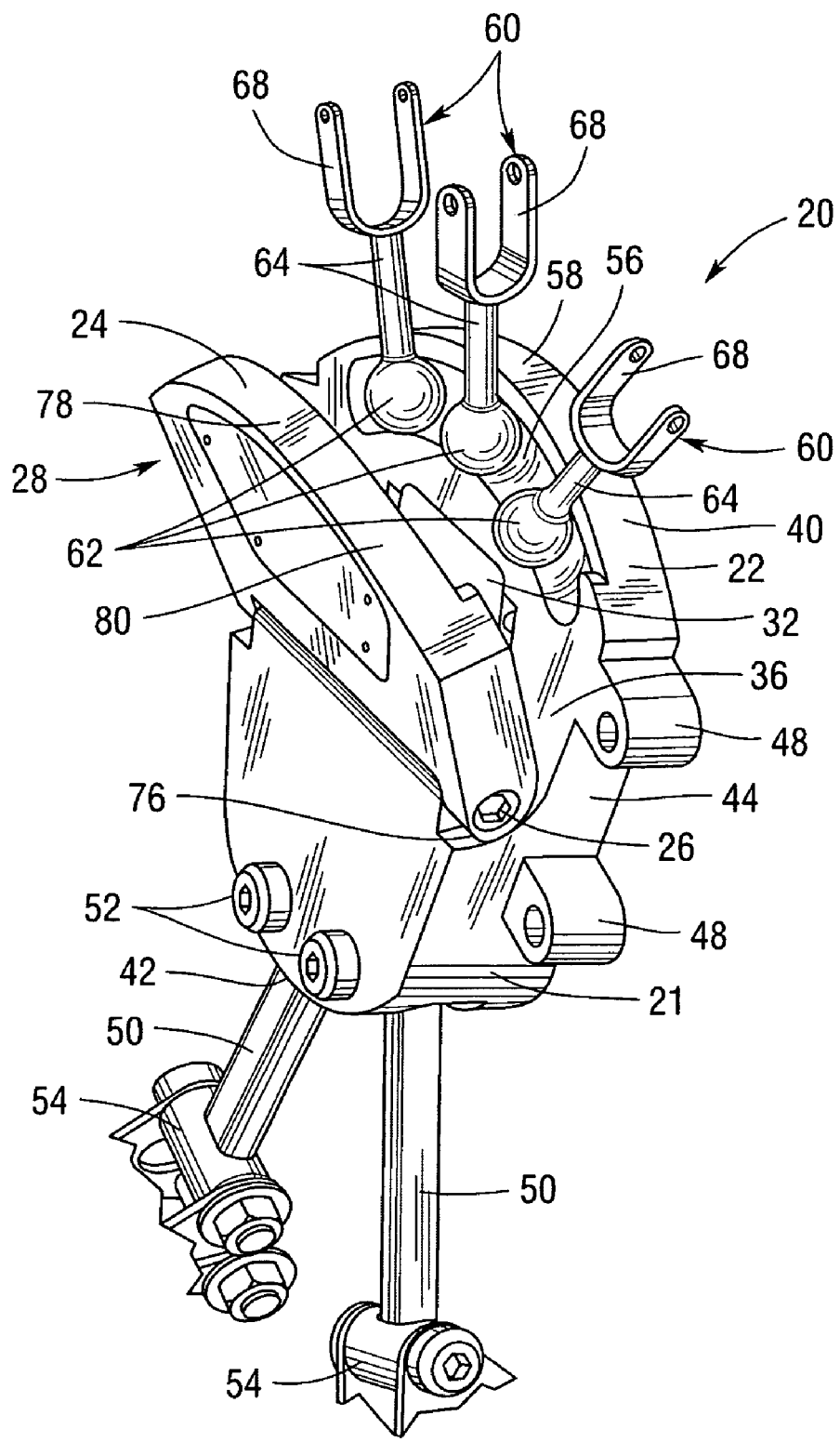
FIG. 3 is a perspective view of the cargo parachute release apparatus wherein the hinged member is in a partially open position.
Figure 4:
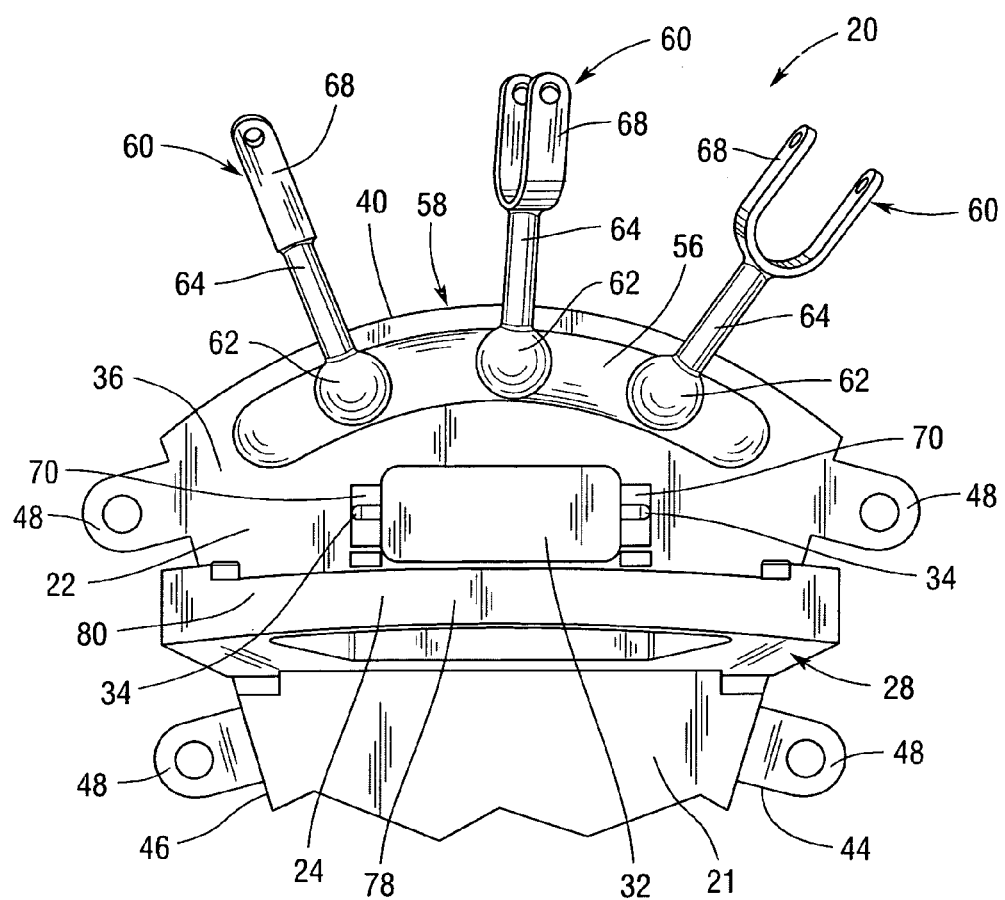
FIG. 4 is a front elevational view, partly in broken line, of the cargo parachute release apparatus wherein the hinged member is in the fully open position.
Figure 5:
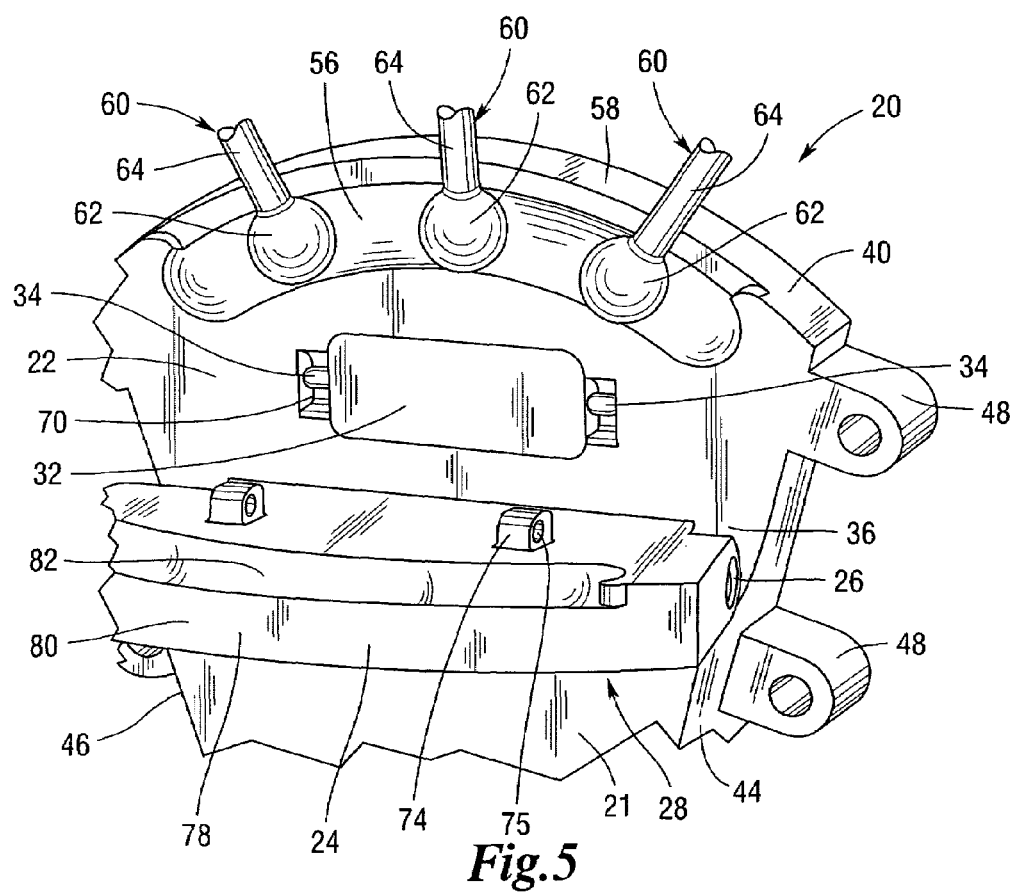
FIG. 5 is a perspective view, partly in broken line, of the cargo parachute release apparatus wherein the hinged member is in the open position.
Figure 6:
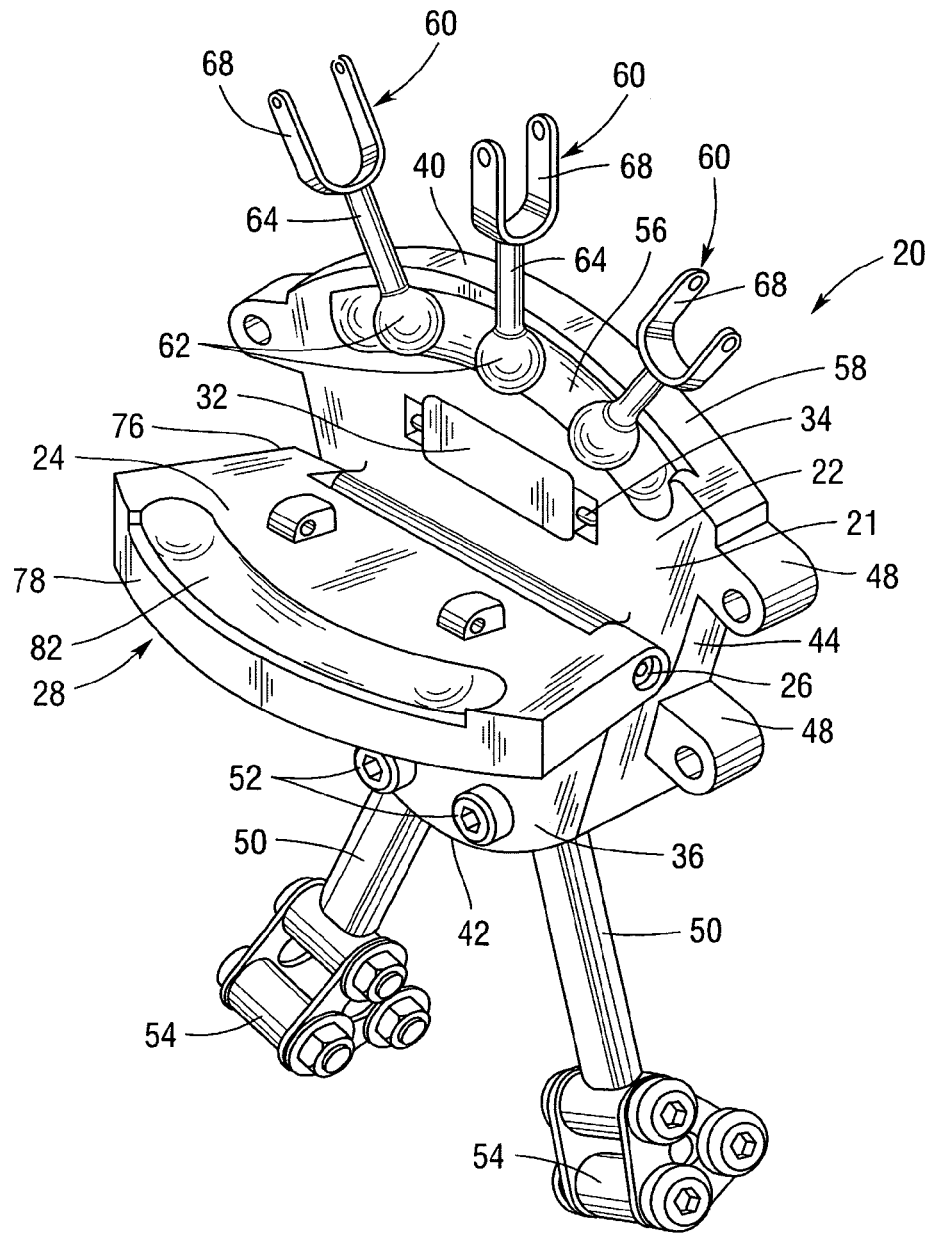
FIG. 6 is a perspective view of the cargo parachute release apparatus wherein the hinged member is in the open position.
Figure 10:
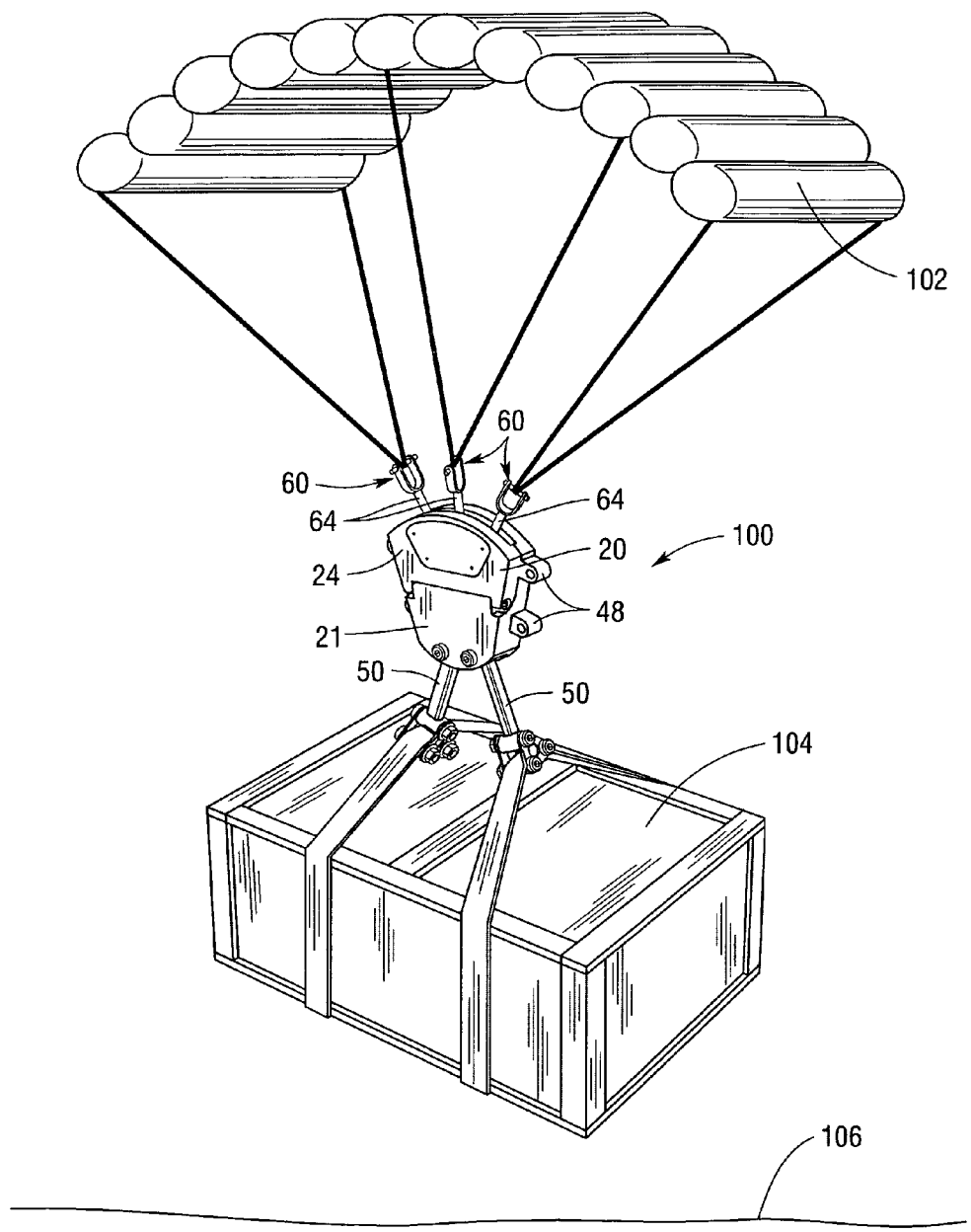
FIG. 10 is a diagrammatic view of the cargo parachute release joined to a parachute and cargo.

As shown generally in FIGS. 1-9, in a preferred embodiment the cargo parachute release 20 of the invention has a mechanical assembly 21 that includes an assembly plate 22 and a hinged member 24 connected to one another by a hinge pin 26. The hinged member 24 is movable between an open or release position 28 shown in FIGS. 3 and 4, and a closed position 30 shown in FIG. 1. As shown in FIG. 5, the hinged member 24 has release pin receiving formations 74 that have bores 75 that are adapted to receive release pins 34. The cargo parachute release 20 also includes an EPA 32 from which the release pins 34 extend, and the EPA 32 is fitted in a recess 70 formed in the assembly plate 22, as shown in FIGS. 4 and 5. The hinged member 24 is moved into a closed position 30, such that the release pins 34 extend from the EPA 32 and are received in the bores 75 in the release pin receiving formations 74. It is pointed out that the hinged member 24 is moved into the closed position 30 at a factory when the cargo parachute release 20 is assembled. In addition, when the hinged member 24 is in the closed position 30, parachute riser attachment components 60 that connect to the parachute 102, shown in FIG. 10, are positioned in a first curved recess 56 formed in the assembly plate 22, as shown in FIG. 4, and a second curved recess 82 formed in the hinged member 22, as shown in FIG. 6.

Figure 13:
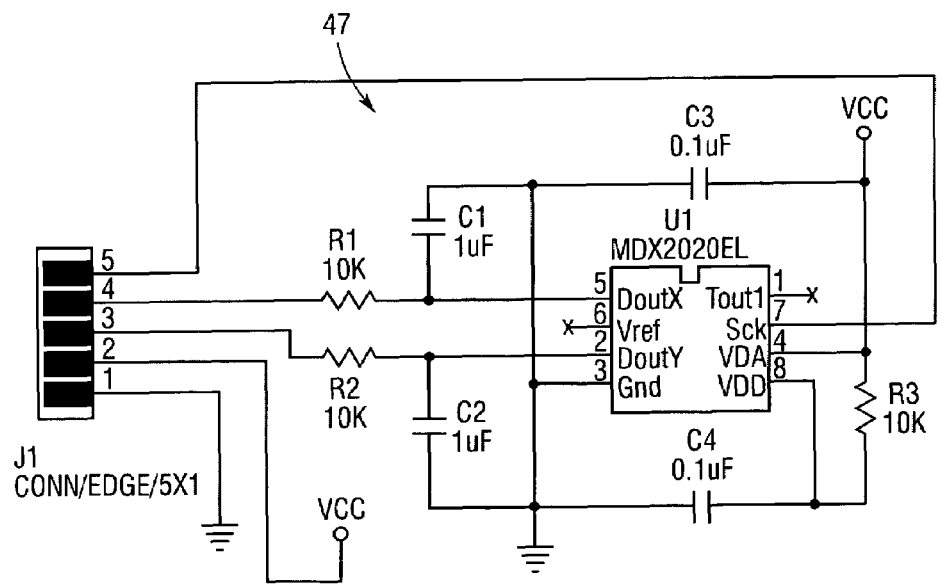
FIG. 13 is a portion of the circuit diagram for the vertical accelerometer component of the EPA.

The assembly plate 22 has an EPA recess 70, as shown in FIGS. 4 and 5, that is sized to receive the EPA 32. The operation of the EPA 32 is depicted in the block diagram of FIG. 11, and the circuitry of the EPA 32 is shown in detail in FIGS. 12A-12G and 13. One of the functions of the EPA 32 is to determine when the parachute cargo release system 100 should release the parachute 102, shown in FIG. 10, such that the cargo 104 connected to the cargo parachute release 20 is not dragged or rolled along the ground 106. As shown in the block diagram of FIG. 11, the timing of the release of the parachute 102 is carried out by a circuit assembly 41 that includes a microprocessor 43, a vertical accelerometer 45 and a horizontal accelerometer 47 (shown in FIGS. 12E and 13) that can detect the direction of motion of the cargo parachute release 20, a flash memory chip 49 (FIG. 12B), an RS232 interface 51 (shown in FIG. 12A) that provides for transmitting and receiving, RS232 interfaces being well known to those having ordinary skill in the art, a network of resistors forming a strain gage 53, a firing circuit 55, a voltage supervisor section 57 and a voltage regulator network 59. A battery connector network assembly 61 (shown in FIG. 12F) receives power from a battery pack 63 and supplies power for the circuit assembly 41.

Figure 11:
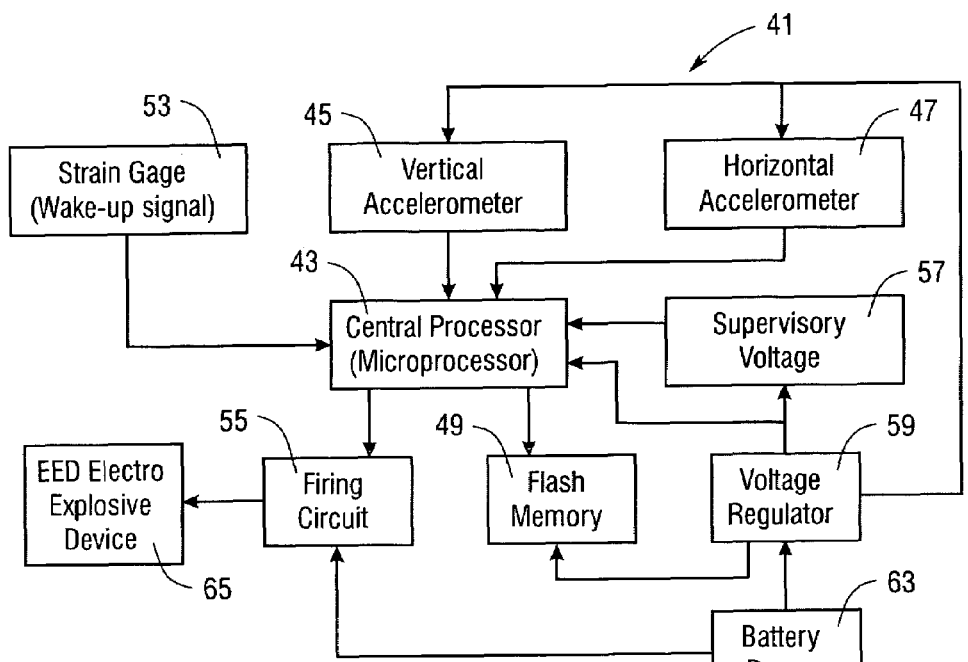
FIG. 11 is a block diagram depicting the electronic system of the EPA.
Figure 12A:
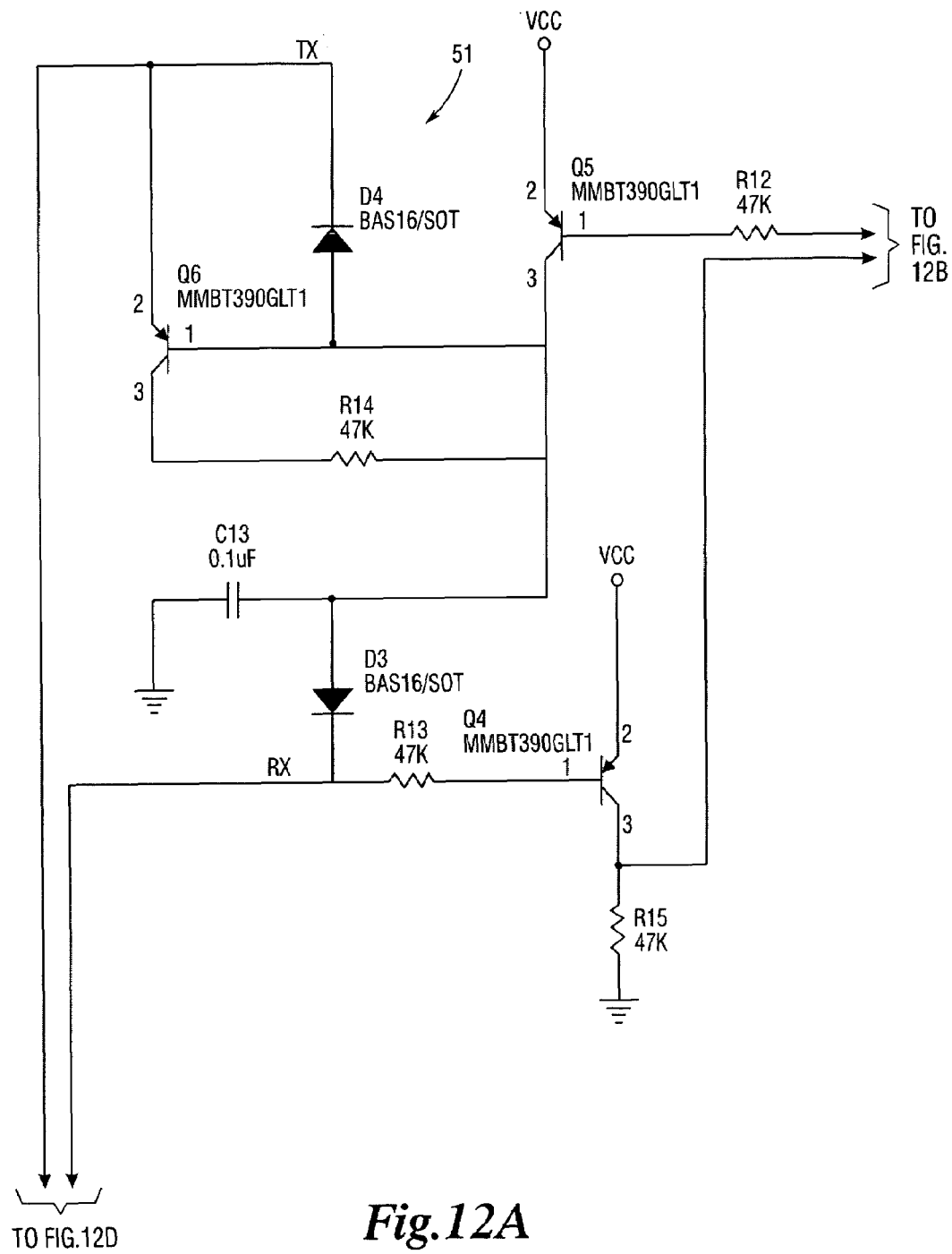
FIGS. 12A-12G are portions of the circuit diagram of the EPA.
Figure 12B:
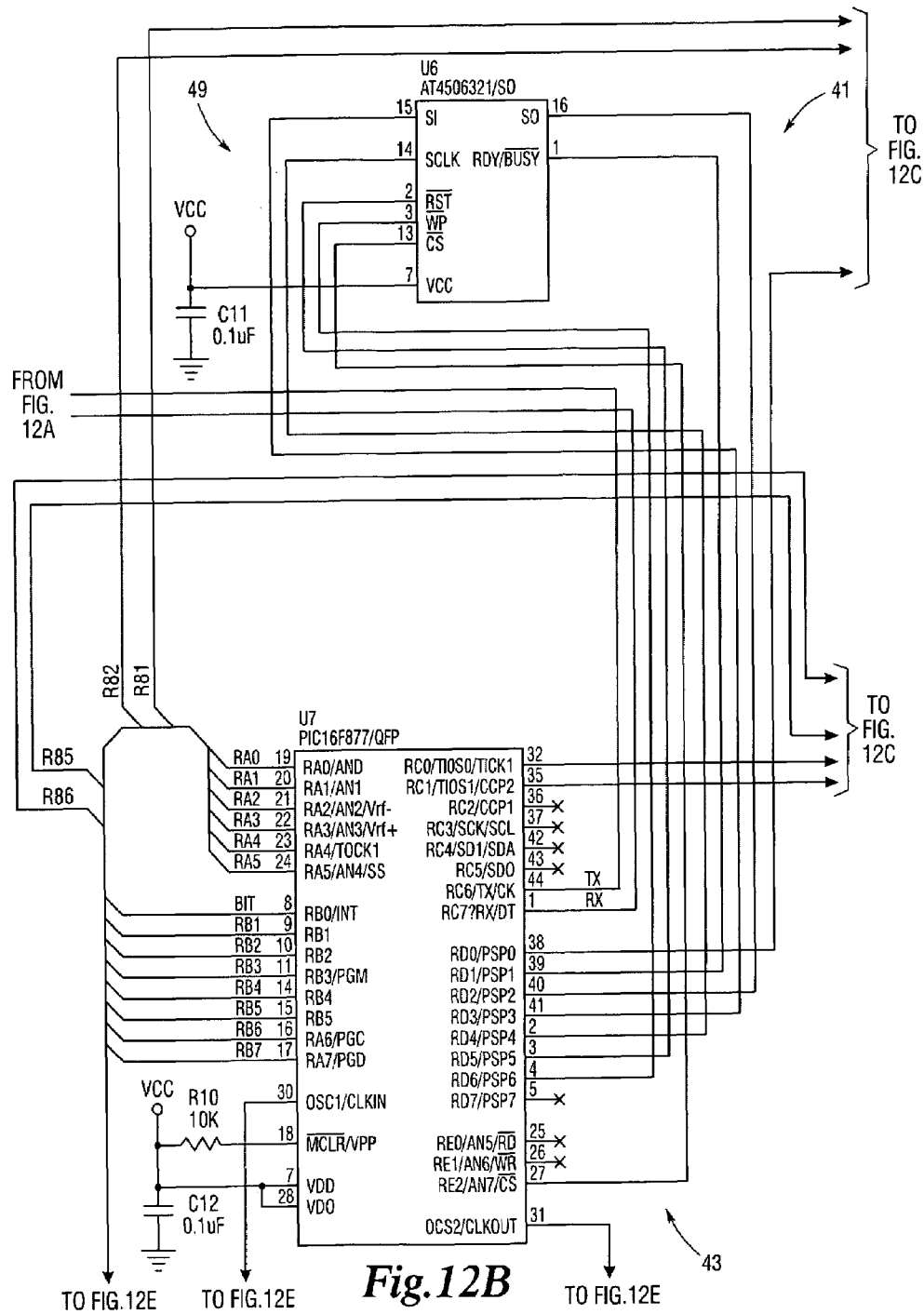
Figure 12C:
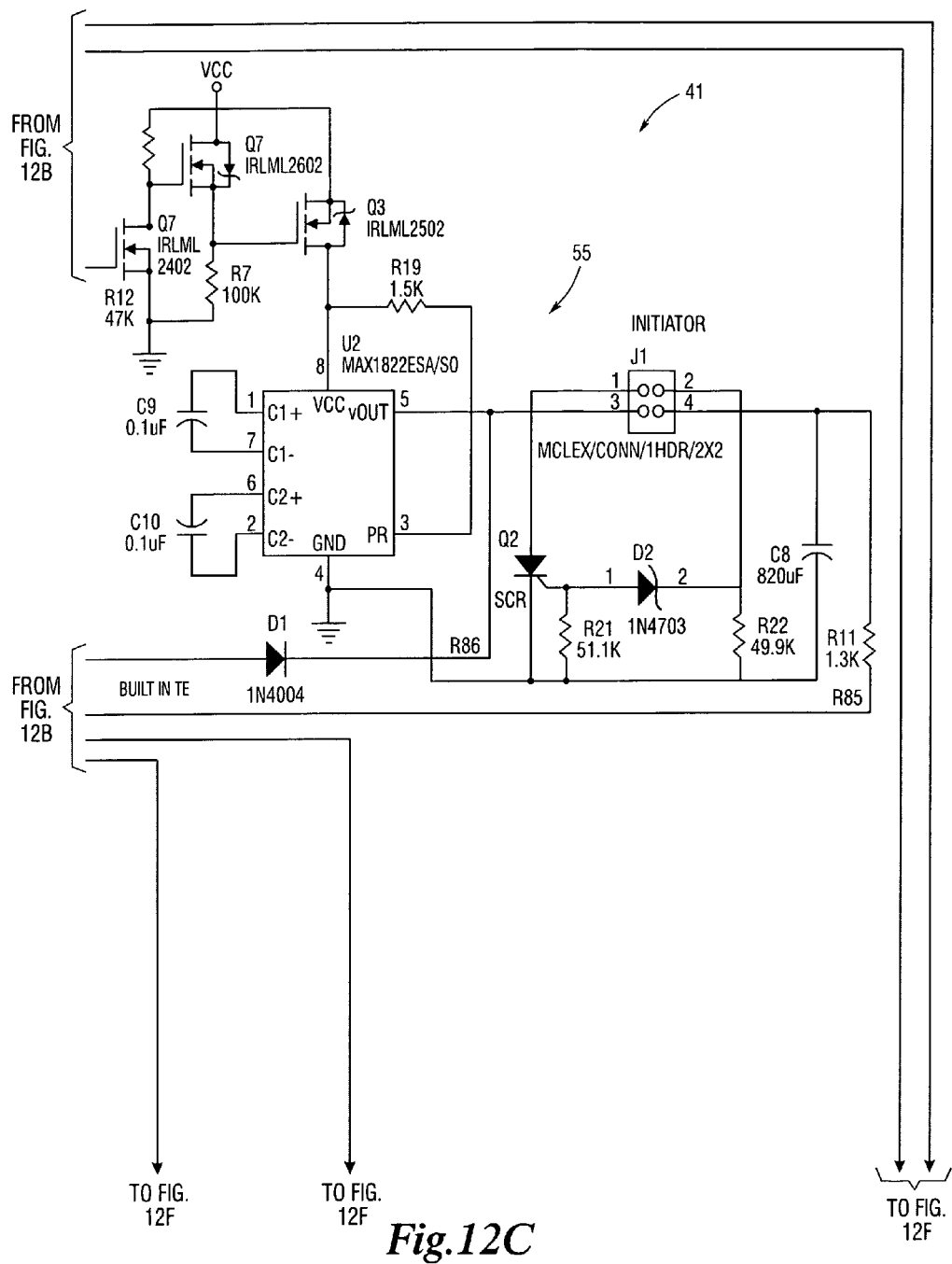
Figure 12D:
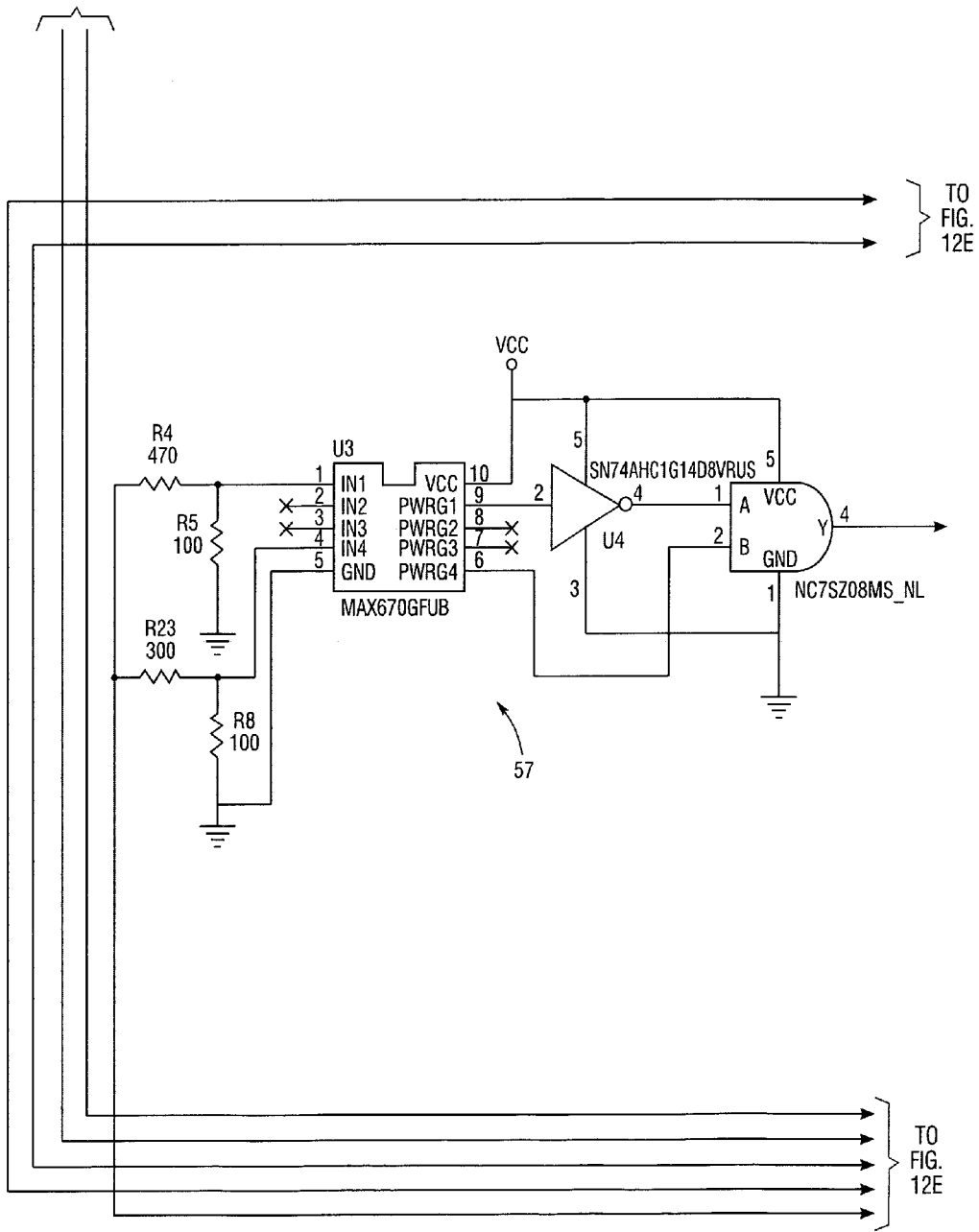
Figure 12E:
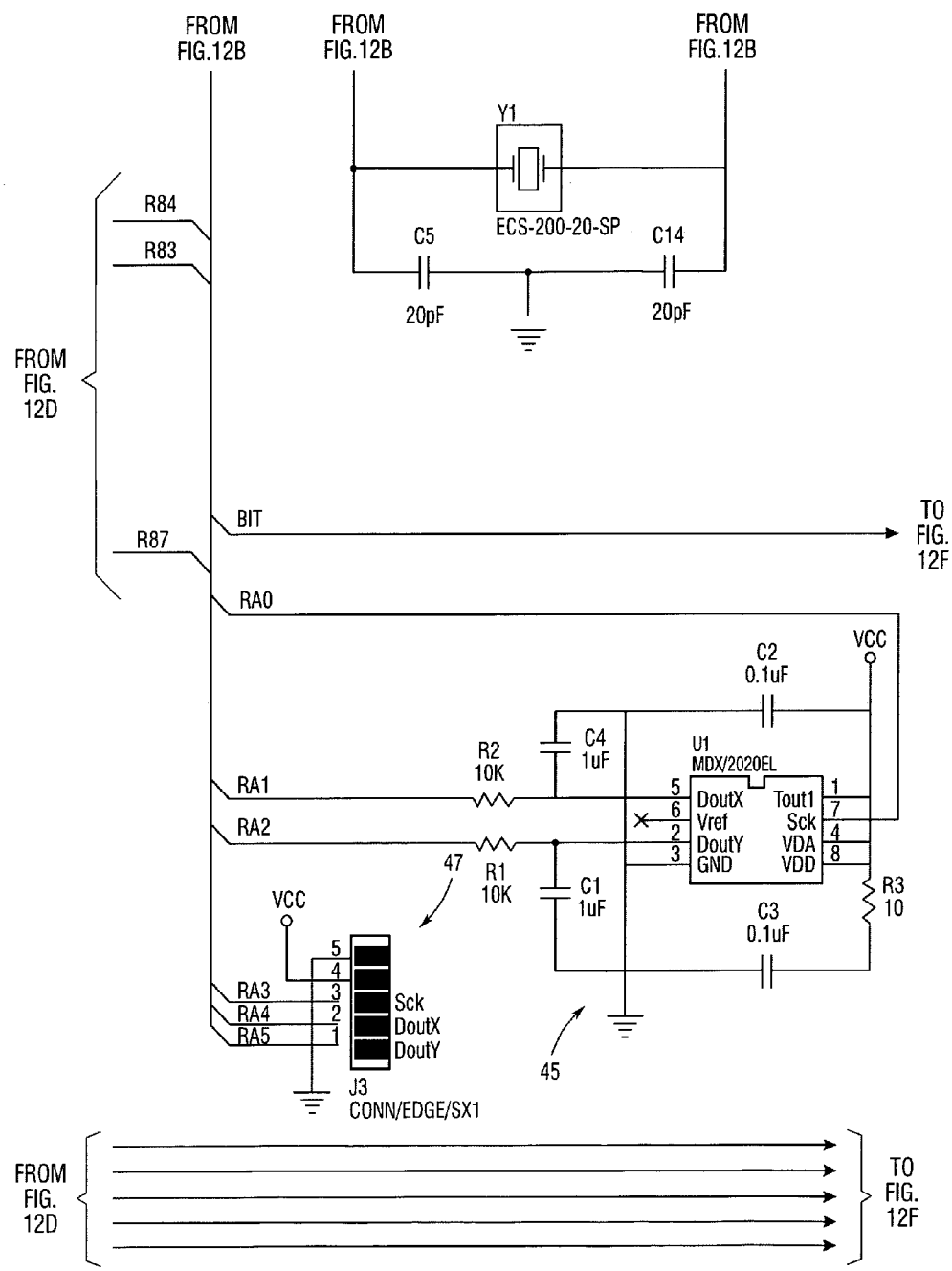
Figure 12F:
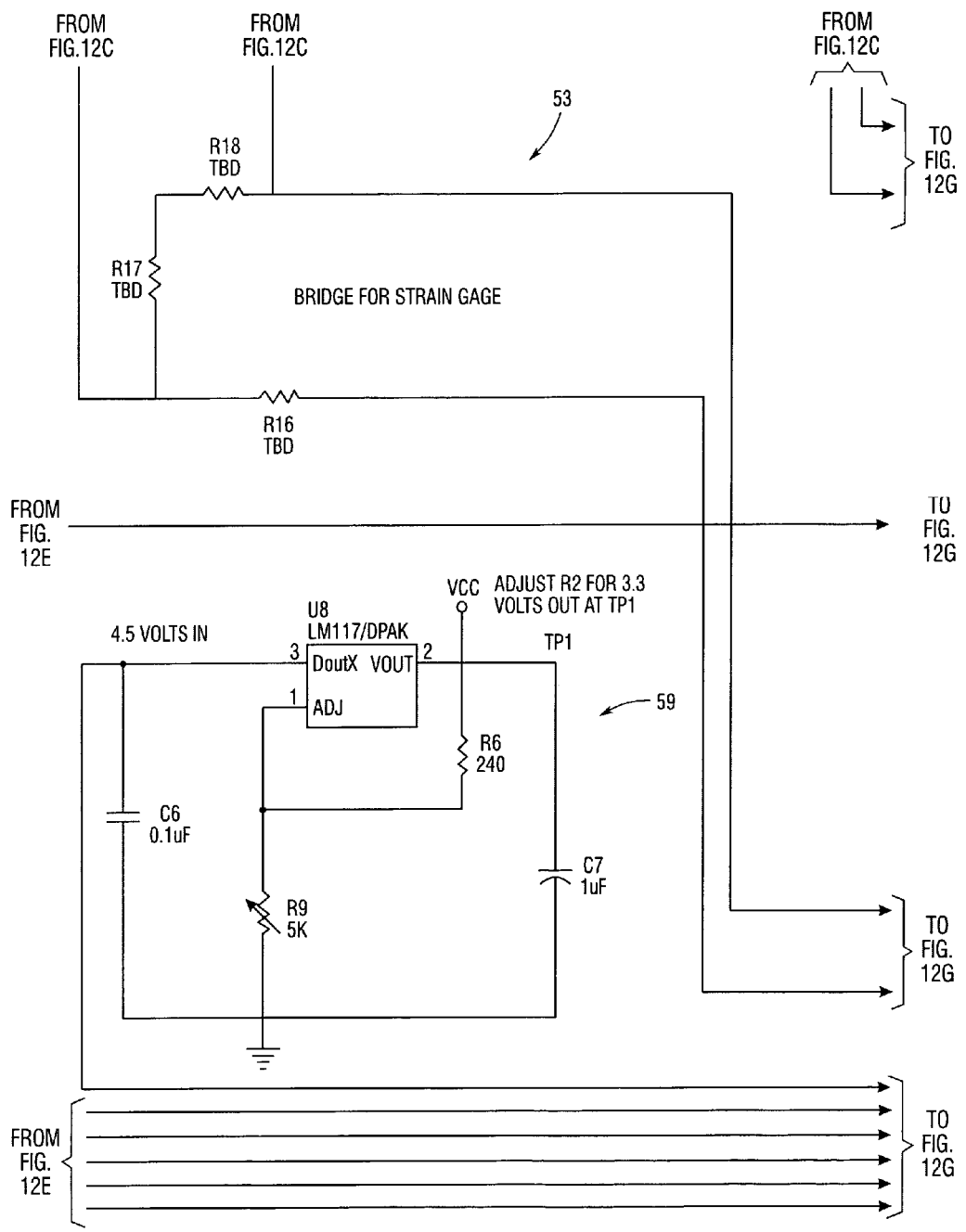
Figure 12G:
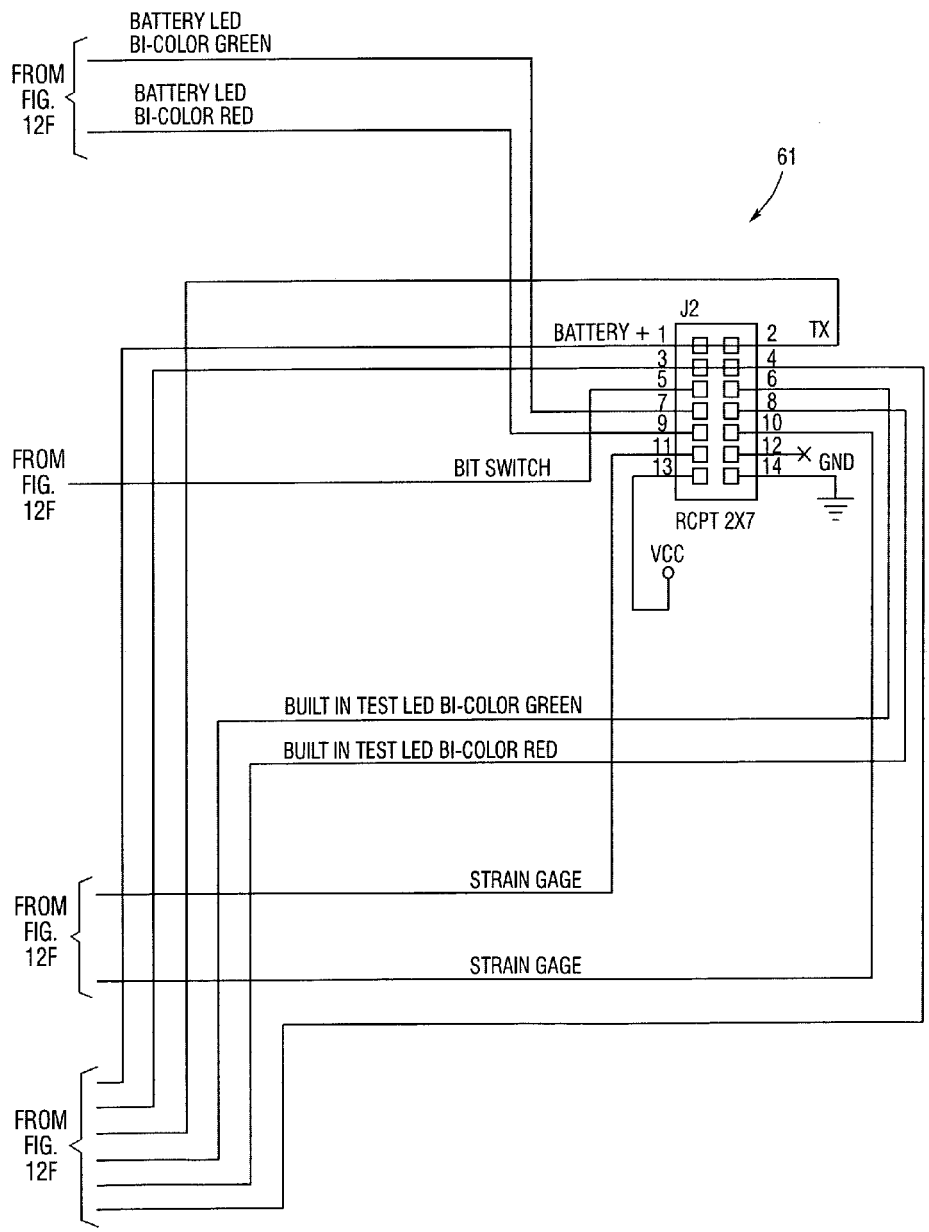

As shown in the flow chart of FIG. 11, the EPA 32 has the strain gage 53, and the strain gage 53 is for detecting the sudden deceleration caused when the parachute 102 opens as voltage and this voltage is sent to the microprocessor 43. The voltage acts to "wake up" or activate the microprocessor 43 to begin operation of the circuit assembly 41. In addition, as will be described presently, an arming pin, pull pin or release pin as indicated in FIG. 11 at 53a can be used that, when pulled during extraction of the cargo 104, can cause current to flow in the circuit assembly 41. The microprocessor 43 activates the beginning measurements of the strain gage 53, the vertical accelerometer 45 and the horizontal accelerometer 47 to sense the vertical and horizontal movement of the descending cargo parachute 102 along with the strain imparted on the strain gage 53 from the parachute riser attachment components 60. The strain gage 53, vertical accelerometer 45 and horizontal accelerometer 47 send data to the microprocessor 43 for processing and evaluation. The microprocessor 43 sends the data to the flash memory 49 for storage. Microprocessors, flash memories, accelerometers and strain gages are well known to those having ordinary skill in the art.

The microprocessor 43 has predetermined stored impact signal parameters. The microprocessor 43 continuously monitors the incoming data from the vertical and horizontal accelerometers 45, 47, respectively, and strain gage 53 until the vertical and horizontal accelerometers 45, 47, respectively, and strain gage 53 data match the predetermined impact signal parameters. When the predetermined impact parameters are met, it is an indication that the cargo 104 has impacted with the ground 106 (shown in FIG. 10) or water.

Upon receiving the impact signal data, the microprocessor 43 sends an electronic command signal to the firing circuit 55, and this actuates an EED 65. The firing of the EED 65 causes the release pins 34 to retract into the EPA 32 and move out of the bores 75 in the hinged member 24, and this allows the hinged member 24 to move to the open position 28. The EED 65 is an explosive charge that can be detonated with an electronic signal, and when detonated the charge retracts the release pins 34 into the EPA 32. The EED 65 can also comprise motive means for retracting the release pins 34 such that the hinged member 24 can open. For example, the EED 65 can be a solenoid, as indicated in FIG. 11 at 65a, capable of retracting the release pins 34. Solenoids are well known to those having skill in the art.

FIGS. 12A-12G and 13 diagrammatically shows the circuit assembly 41. As shown, the battery 63 supplies power to the battery connector network 61 to power the circuit assembly 41. When the parachute 102 is dropped from an aircraft, the strain gage 53 sends a signal to the microprocessor 43, and the microprocessor 43 begins collecting incoming data from the vertical accelerometer 45, and horizontal accelerometer 47 and strain gage 53. The microprocessor 43 processes the incoming data and stores it in the flash memory 49 for future reference. Voltage in the circuit assembly 41 is controlled by the voltage supervising circuit 57 and the voltage regulator network 59. In particular, the voltage regulator network 59 supplies a constant voltage to the circuit assembly 41, and the voltage supervising circuit 57 serves to maintain correct voltage requirements for the microprocessor 43. When the vertical accelerometer 45, horizontal accelerometer 47 and strain gage 53 send a data that matches a predetermined impact signal to the microprocessor 43, the microprocessor 43 sends a signal to the firing circuit 55. The firing circuit 55, upon receiving the signal from the microprocessor 43, causes the EED 65 to explode and cause the release pins 34 to withdraw from the bores 75 in the release pin receiving formations 74 in the hinged member 24. As a result, the hinged member 24 moves to the open position 28 and the parachute 102 releases from the cargo parachute release 20.

It is pointed out that the data received from the vertical accelerometer 45, the horizontal accelerometer 47 and strain gage 53 provide a virtual "picture" of the direction of travel of the cargo parachute release 20 as it falls, and this data is transmitted to the microprocessor 43 for processing and analysis. As previously mentioned, the microprocessor 43 stores or contains predetermined firing and non-firing or holding parameters, and the microprocessor 43 matches incoming data from the vertical accelerometer 45, horizontal accelerometer 47 and strain gage 53 with these stored parameters. For example, if the strain gage 53 shows a reduction in load, but the vertical accelerometer 45 and horizontal accelerometer 47 accelerometer indicate a vertical velocity of 24 feet/second, the microprocessor 43 will not send a signal to the firing circuit 55 to fire the EED 65. The above scenario could be caused if the parachute 102 collapses while falling, however, the vertical velocity is an indicator that the assembly has not yet hit the ground.

In addition, as shown in FIG. 2, the EPA 32 contains a built-in test (hereinafter BIT) switch 69. A user pushes the BIT switch 69 and the built in test checks the integrity of the circuit assembly 41, including the batteries and EED 65. If the BIT switch 69 flashes after being pressed, this indicates that the cargo parachute release apparatus 20 can be pushed from the plane and that the parachute will detach when the predetermined parameters are met.

Figure 1:
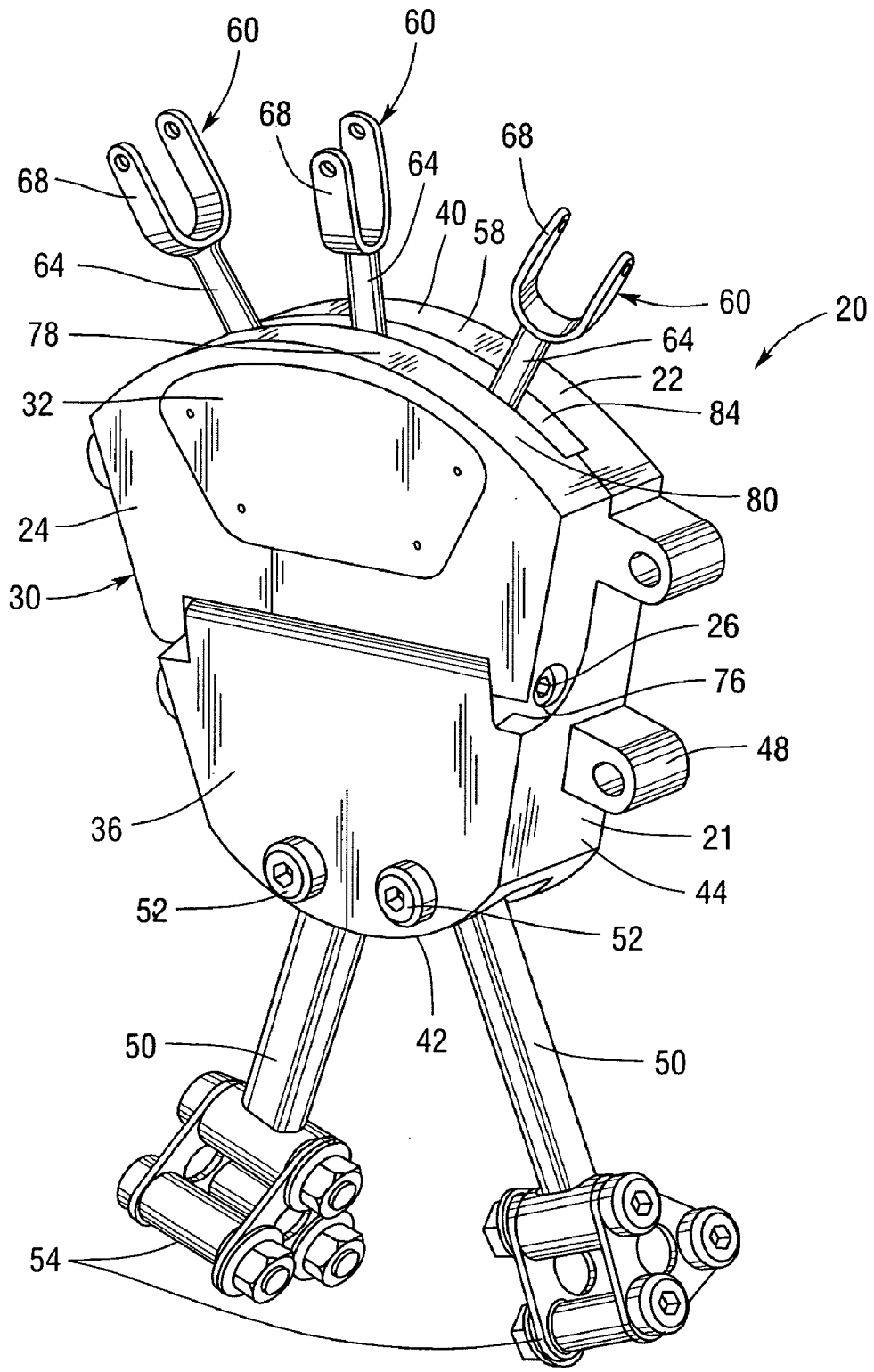
FIG. 1 is a perspective view of the cargo parachute release apparatus wherein the hinged member is in the closed position.

As shown in FIGS. 1 and 2, the cargo parachute release apparatus 20 has a first side 36 and an opposed second side 38, and as shown in FIGS. 3-6 the assembly plate 22 has a parachute attachment end wall 40 and an opposed cargo attachment end wall 42. Extending between the parachute attachment end wall 40 and cargo attachment end wall 42 are opposed first and second edge walls 44, 46, respectively. Extending from each of the first and second edge walls 44, 46, respectively, are piggyback bolt adapters, commonly designated 48. The piggyback bolt adapters 48 allow the cargo parachute release apparatus 20 to be connected to other cargo parachute release apparatuses (not shown) with bolts, which advantageously increases the amount of cargo that can be dropped using the cargo parachute release 20. In the illustrative embodiment shown herein there are four such piggyback bolt adapters 48 extending from the opposed first and second edge walls 44, 46, respectively of the assembly plate 22.

Extending from a position internal to the assembly plate 22 and through the cargo attachment end wall 42 are load brackets 50. One end of each of the load brackets 50 is received in and bolted to the assembly plate 22 with bolts 52, and the other end of each of the load brackets 50 is connected to a cargo pallet attachment 54. The cargo pallet attachment 54 points consist of a pin type arrangement that allow for various size pallet straps (not shown) to be attached to the release apparatus 20.

As shown in FIGS. 3-6, the assembly plate 22 has formed therein a first curved race 56 adjacent the parachute attachment end wall 40. The parachute attachment end wall 40 has a narrow portion 58. As will be described presently, the first curved race 56 is for receiving parachute riser attachment components 60. As shown in FIGS. 3 and 4, each of the parachute riser attachment components 60 has a ball-shaped portion 62 joined to a riser attachment portion 64. The riser portion 64 has a fastener 68 that connects to parachute risers (not shown) in a known manner.

Referring now to FIGS. 4 and 5, the assembly plate 22 has a recess 70 sized to receive the EPA 32 therein. In particular, the recess 70 is defined in the first side 36 of the assembly plate 22 between the first curved race 56 and the hinge pin 26, such that when the hinged member 24 is the closed position 30 the EPA 32 is positioned in the recess 70 and between the assembly plate 22 and hinged member 24. As shown in FIG. 5, the EPA 32 is substantially flush with the surrounding assembly plate 22 and is connected to the assembly plate 22 with, for example, bolts 72 as shown in FIG. 2. As shown in FIGS. 4 and 5, the release pins 34 extend from each side of the EPA 62. When the cargo parachute release apparatus 20 is in the closed position 30, the release pins 34 are positioned in bores 75 of release pin receiving formations 74 that extend from the hinged member 24. The release pin receiving formations 74 are best shown in FIG. 5. When the release pins 34 are positioned in the release pin receiving formations 74, the hinged member 24 is prevented from moving from the closed position 30 to the open position 28.

When the EPA 32 is subsequently fired, the release pins 34 are rapidly retracted out of the release pin receiving portions 74 and into the EPA 32, which thus allows the hinged member 24 to move from the closed position 30 to the open position 30, which results in the release of the parachute riser attachment components 60. The release pins 34 seat in replaceable roller bushings 94 shown in FIG. 14.

Figure 7:
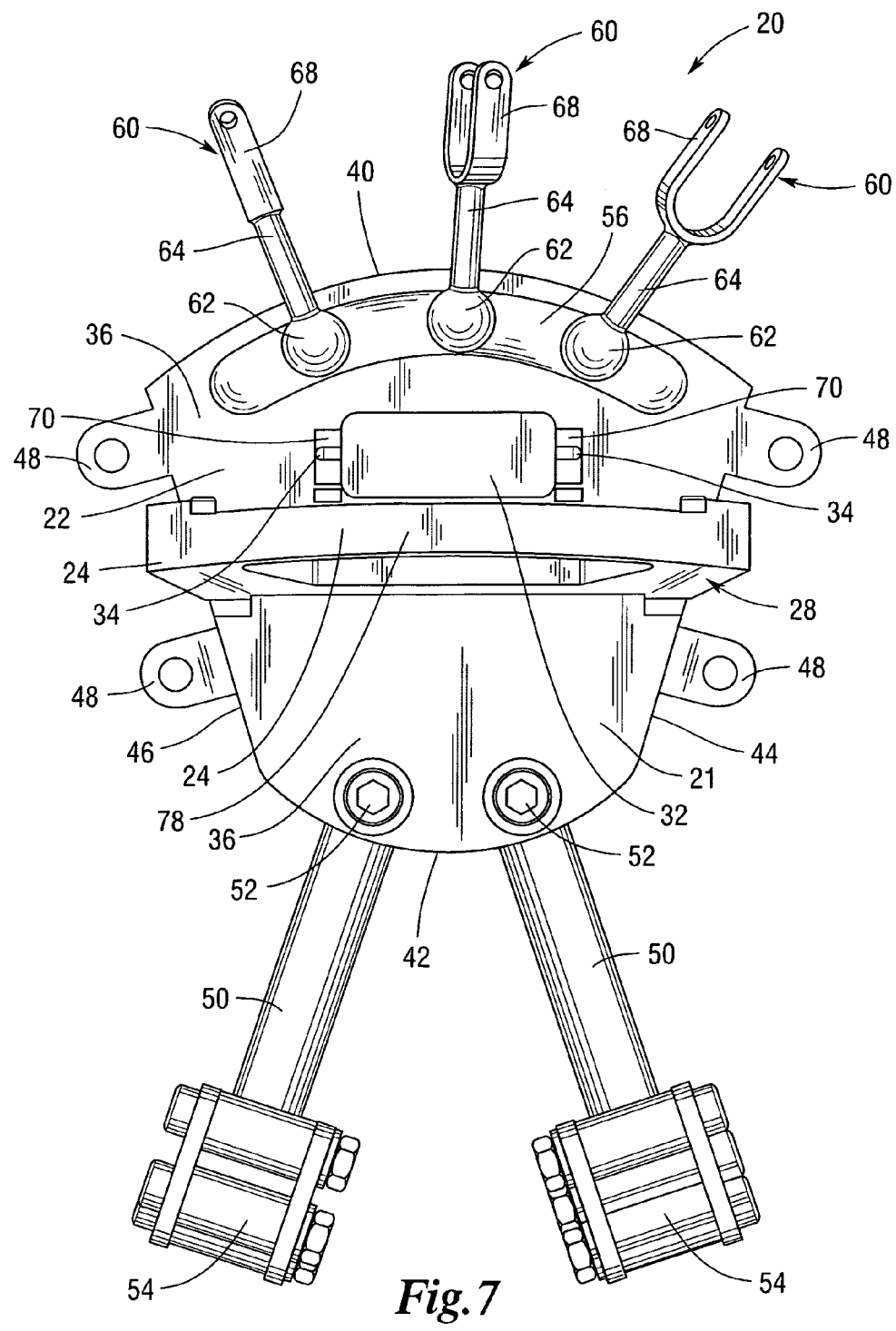
FIG. 7 is a front elevational view of the cargo parachute release apparatus wherein the hinged member is in the open position.

As shown in FIGS. 1 and 7, the hinged member 24 has a hinged end 76 and an opposed curved end 78 having a hinged member narrow portion 80. As shown in FIGS. 5 and 6, the hinged member 24 has a second curved race 82 that is adjacent to the narrow portion 80. As shown, the pair of release pin receiving formations 74 extend from the hinged member 24 between the second curved race 82 and the hinged end 76.

In use, prior to closing the hinged member 24 and assembly plate 22 together, the parachute riser attachment components 60 are positioned in the assembly plate 22, such that the ball portions 62 are positioned in the assembly plate first curved race 56. FIG. 3 shows three such parachute riser attachment components 60, and in another illustrative embodiment (not shown) there may be five parachute riser attachment components 60.

Upon closing the hinged member 24, the ball portions 62 move into the second curved race 82, such that the ball portions 62 are positioned in the recess defined by the first and second curved races 56, 82, respectively. In addition, as shown in FIG. 1, a slot 84 is defined between the hinged member narrow portion 80 and the assembly plate narrow 58. The slot 84 is sized such that the parachute riser attachment components 60 can extend through the slot 84 and move back and forth along the slot 84, but the ball portions 62 joined to the riser attachment portions 64 cannot pass through the slot 84.

When the cargo parachute release apparatus is in the closed position 30 shown in FIG. 1, the release pins 34 are positioned in the release pin receiving formations 74 extending from the hinged member 24. The hinge pin 26 bears a portion of the load under which the cargo parachute release apparatus 20 is placed, allowing for decreased frictional forces between the release pins 34 and the release pin receiving formations 74. It is pointed out that the release pins 34 are positioned in the pin receiving formations 74.

Figure 19:
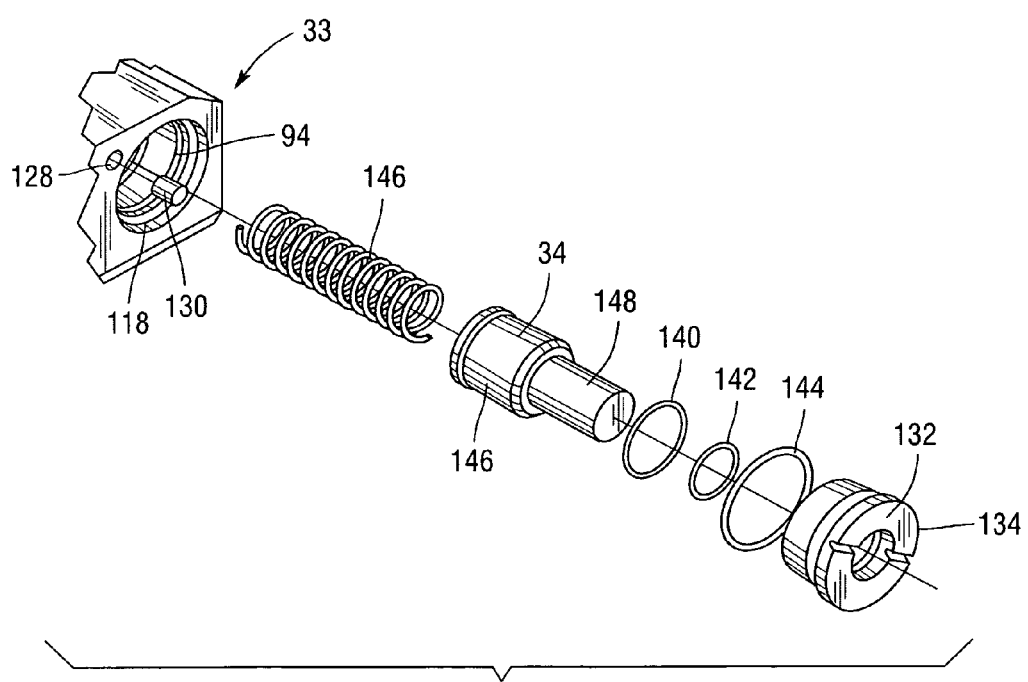
FIG. 19 is an exploded view of the release pin and release pin retainer.

After the release apparatus 20 has been actuated, the EPA 32 can be readily removed and replaced or refurbished by replacing the EED 65, allowing for field or depot level refurbishment. These roller bushings 94, shown in FIG. 19, can be scored or otherwise damaged by the release pins 34 during actuation and the roller bushings 94 are therefore replaceable. In addition, the roller bushings 94 provide for decreased friction between the release pins 34 and assembly plate 22 so that there is a lower release force on these release pins 34 during actuation.

Figure 14:
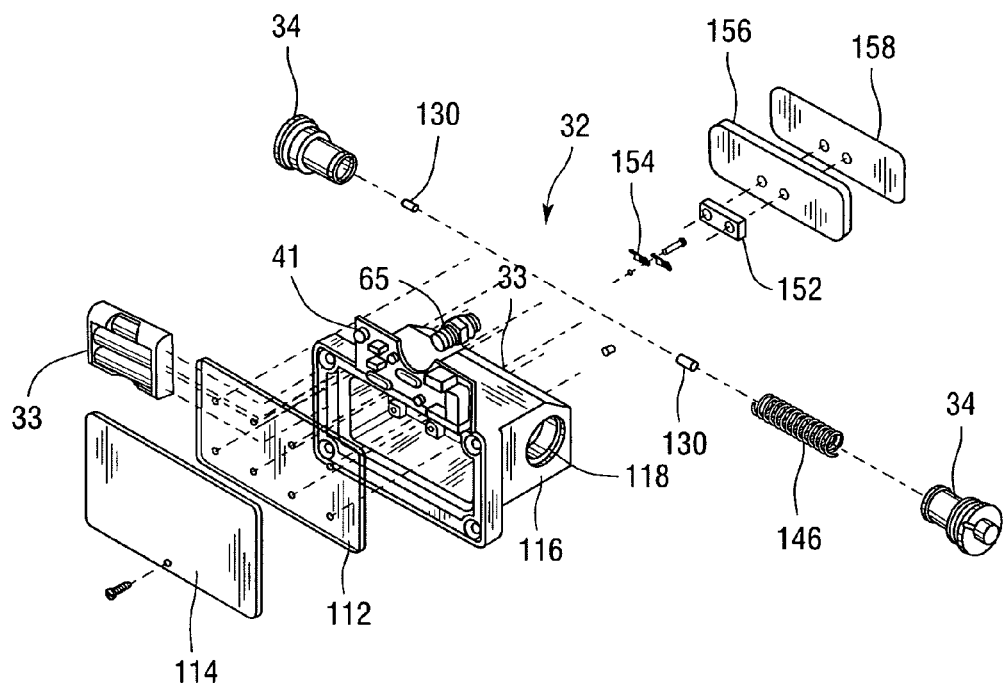
FIG. 14 is an exploded view of the components of the EPA.
Figure 15:
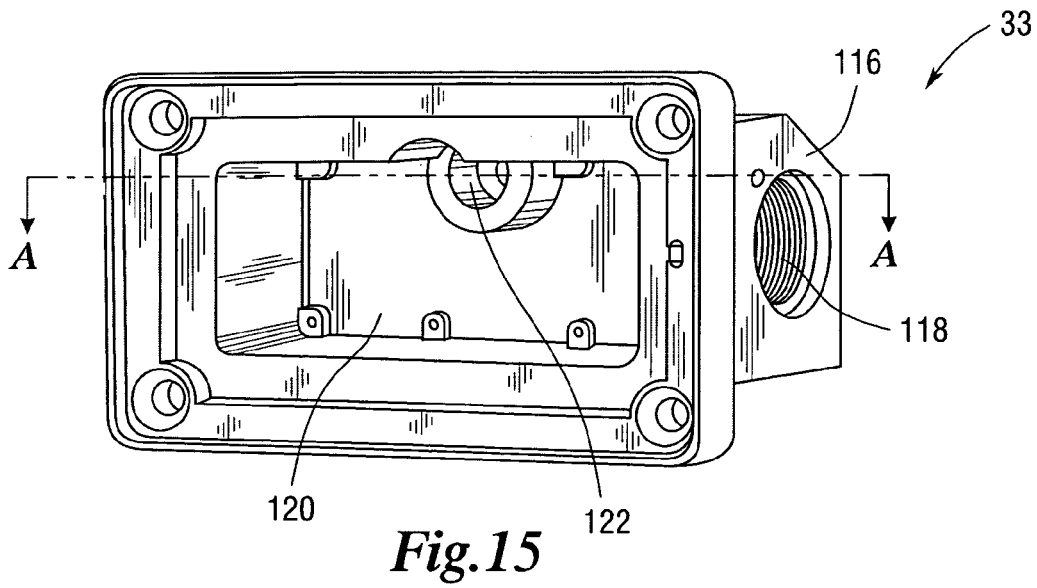
FIG. 15 is a perspective view of the housing of the EPA.
Figure 16:
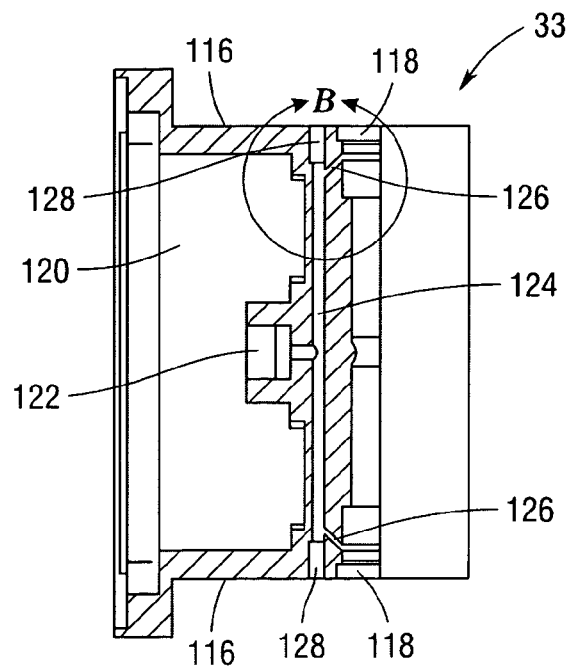
FIG. 16 is a sectional view of the housing taken along cut line A-A shown in FIG. 14.
Figure 17:
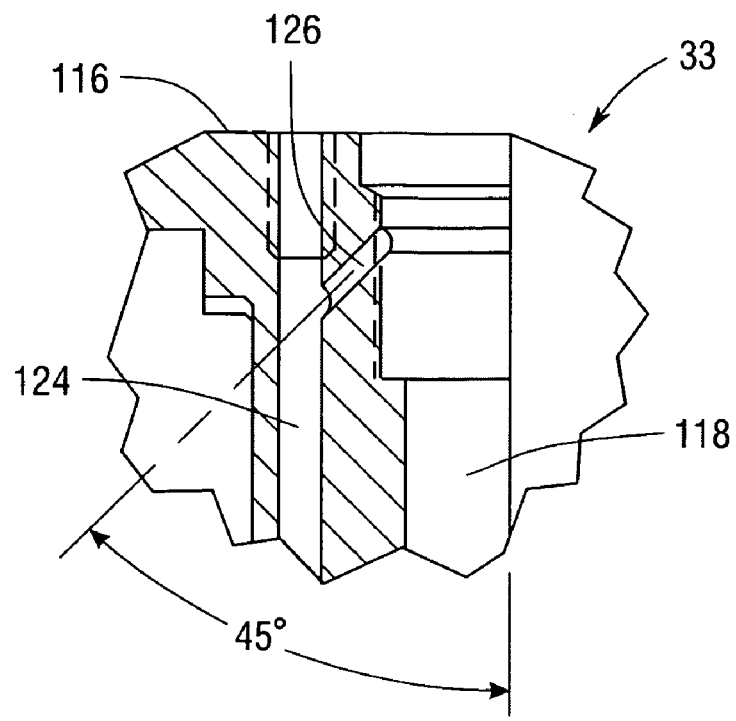
FIG. 17 is an enlarged portion of FIG. 16 indicate by arrow B in FIG. 16.

FIG. 14 is an exploded view the EPA 32. The EPA 32 has a housing 33 that is sized to be received in the recess 70 of the assembly plate 22. The battery pack 63 is positioned in the housing 33 and the circuit assembly 41 is mounted in the housing 33. As shown in FIGS. 15-17, the housing 33 is provided with a housing recess 110. A seal 112 is positioned between the housing 33 and a seal plate 114. The housing 33 also has opposed release pin walls 116 each having a bore 118.

As shown in FIG. 15, the housing 33 has a housing recess 120, and the seal plate can be connected to the housing 33. The housing recess 120 extends to an EED recess 122 that is sized to receive the EED 65. As shown in FIGS. 16 and 17, the EED recess 122 extends to a elongate passage 124. The elongate passage 124 extends to release pin passages 126 that are angled in a direction away from the elongate passage 124. As shown in FIG. 17, in one of the preferred embodiments the release pin passage 126 make about a 45° angle with the elongate passage 124. The release pin passages 126 extend to the bores 118. In addition, the elongate passage 124 meets with plug recess passages 128 that are for receiving gas port cover plugs 130, and shown in FIG. 19. As will be described presently, the elongate passage 124 and release pin passage 126 are for allowing the flow of pressured gas when the EED 65 is detonated.

Figure 18:
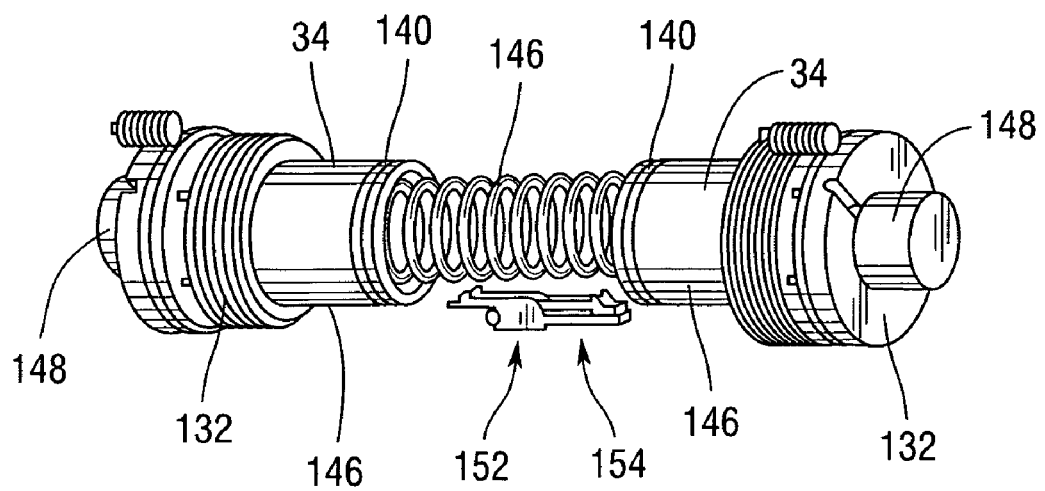
FIG. 18 is a perspective view of the latch pins and spring.

As shown in FIGS. 18-22, the bores 118 are sized to receive release pin retainers 132 having retainer openings 134, and the retainer openings 134 are sized to receive the release pins 34. The release pin retainers 132 are treaded to the housing 33, and in particular, into the bores 118. Moving from left to right in FIG. 19, between the release pin 34 and the release pin retainer 134 is an O-ring 140, and inner O-ring 142 and an outer O-ring 144. The outer O-ring 144 is positioned around the release pin retainer 134, the O-ring 140 is positioned around a larger diameter portion 146 of the release pin 34 and the inner O-ring 142 is positioned around a smaller diameter portion 148 of the release pin 34. A spring 146 is provided that, as shown in FIG. 18, forces on the larger diameter portions 146 of the release pins 34.

Figure 20:
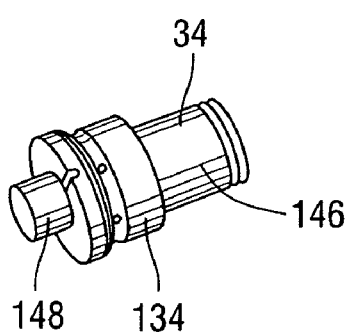
FIG. 20 is a perspective view of the release pin and release pin retainer.
Figure 21:
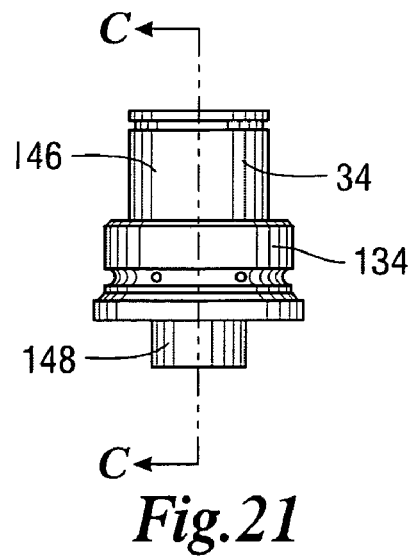
FIG. 21 is a perspective view of the release pin and release pin retainer showing gas flow openings in the release pin retainer.
Figure 22:
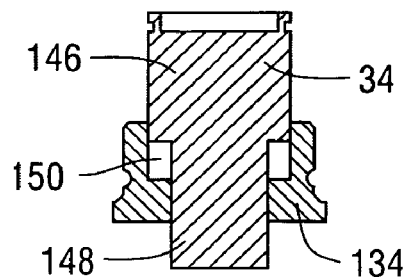
FIG. 22 is a sectional view of the release pin positioned in the release pin retainer taken along cut line C-C shown in FIG. 21.

Shown in FIGS. 20-22, the arrangement of the release pin 34 and the release pin retainer 134. There is a pressurization space 150 defined between the release pin 34 and the release pin retainer 134. The release pin retainer 134 has gas flow ports 152 as shown in FIG. 21. The gas flow ports 152 are for accommodating the flow of gas when the EED 65 explodes. In particular, when the EED 65 explodes, the pressurized gas flows through the elongate passage 124 and then through the release pin passages 126. From there, the pressurized gas flows through the gas flow ports 152 in the release pin retainer 134 and into the pressure chamber 150. Once in the pressure chamber 150 the pressurized gas forces on the release pin 34, and the release pins 34 are caused to move in a direction toward one another and compress the spring 146, and they move or retract into the housing 33. There is a key mechanism 152 that releases piston retainers 154 that retain the release pins 34 in the housing 33, that is, in the retracted position. Thus, after detonation of the EED 65, the release pins 34 retract, the hinged member 24 opens, and the parachute 102 is released. In one of the preferred embodiments the entire release process takes about one second. There is also a housing backing 156 provided with a label 158.

The EED 65 is a replaceable component. Once the cargo parachute release apparatus 20 has been used and the EED 65 fired, the EED 65 can be advantageously replaced and the EPA 32 can be reused, which saves on the costs associated with using the cargo parachute release apparatus 20.

In another embodiment, there can be an arming pin, pull pin or release pin as indicated in FIG. 11 at 53a that connects to a switch (not shown). When the cargo 104 is extracted from the plane and dropped, the arming pin is pulled and this closes the switch causing current to flow in the circuit assembly 41. Thus, the pulling the arming pin when the cargo 104 is dropped activates the EPA 32. In addition, in such an embodiment the strain gage 53 is not required, because the EPA 32 is armed when the arming pin is pulled. Thus the EPA 32 can be made without the strain gage.

In yet another embodiment, the EPA 32 can have both the strain gage 53 as described above, and the above-described arming pin indicated in FIG. 11 at 53a and switch which will provide for a degree of redundancy to arm the EPA 32.

Thus, the present cargo parachute release 20 advantageously releases a parachute 102 at the precise moment such that the cargo 104 is not dragged or rolled upon impacting the ground 106, which advantageously protects the cargo 104 from damage.

It will be appreciated by those skilled in the art that while a cargo parachute release apparatus has been described above in connection with particular embodiments and examples, it is not necessarily so limited, and other embodiments, examples, uses, and modifications and departures from the embodiments, examples, and uses may be made within the scope and spirit of the present invention.

What is claimed:

1. A cargo parachute apparatus for releasing cargo from a parachute when the cargo impacts ground or water, the cargo parachute apparatus comprising:
   a) a mechanical assembly attached to the cargo and the mechanical assembly releasably connected to the parachute,
   b) an electronic assembly including a sensor responsive to impact of the cargo with the ground or water which provides a signal when impact is detected and motive means and a circuit for activating the motive means to release the parachute in response to the signal from the sensor indicating impact of the cargo with the ground or water, c) wherein the mechanical assembly has a hinged member having at least one release pin receiving formation with a bore and the electronic assembly has at least one release pin positioned in the bore when the hinged member is in a closed position, and wherein the hinged member is connected to an assembly plate, and d) wherein the assembly plate has at least one first race and the hinged member has at least one second race and when the hinged member is in the closed position a slot is formed between the hinged member and assembly plate and the slot extends to the at least one first race and the at least one second race a parachute riser attachment component having a ball portion and a riser portion and when the hinged member is in the closed position the ball portion is positioned in the at least one first race and the at least one second race and the riser portion is positioned in the slot, and the parachute riser attachment component is connectable to the parachute, and the electronic assembly includes a microprocessor for sending the signal to the circuit in order to actuate the motive means and retract the at least one release pin from the bore such that the hinged member opens to an open position to release the parachute riser attachment component to detach the parachute from the mechanical assembly and prevent the parachute from dragging the cargo on the ground or water.

2. The cargo parachute assembly according to claim 1 wherein the microprocessor has at least one predetermined parameter and wherein the motive means is actuated when the signal from the sensor matches the at least one predetermined parameter.

3. The cargo parachute apparatus according to claim 2 wherein the motive means is a stored energy device and includes at least one of the following: electro-explosive device, a pressurized gas or a solenoid that is capable of being electronically activated upon receiving a signal from the microprocessor.

4. The cargo parachute assembly according to claim 1 wherein the sensor is capable of detecting external forces including at least one of the following: three axis acceleration and strain.

5. The cargo parachute assembly according to claim 2 wherein the motive means is replaceable after the motive means has been actuated such that the electronic assembly is reusable.

6. A cargo parachute release apparatus for connecting a cargo and a parachute, the cargo parachute release apparatus comprising:

a) a mechanical assembly for connecting to the parachute and the cargo, b) an electronic package assembly including a microprocessor and supported by the mechanical assembly, c) the electronic package assembly has at least one horizontal accelerometer for detecting horizontal acceleration and sending horizontal acceleration data to the microprocessor, a vertical accelerometer for detecting vertical acceleration and sending vertical acceleration data to the microprocessor, d) the microprocessor for processing the horizontal acceleration data and vertical acceleration data and comparing the horizontal acceleration data and vertical acceleration data to one or more predetermined stored impact signal parameters, and e) a firing circuit, wherein the microprocessor is capable of sending a firing signal to the firing circuit when the horizontal acceleration data and vertical acceleration data match the one or more predetermined stored impact signal parameters to release the parachute from the parachute release apparatus, f) the mechanical assembly has an assembly plate and a hinged member hinged to the assembly plate, the hinged member being movable between an open position and a closed position and the assembly plate has a recess and the electronic package assembly is positioned in the recess such that it is located between the hinged member and assembly plate when the hinged member is in the closed position, g) wherein the hinged member has at least one release pin receiving formation with a bore and the electronic assembly has at least one release pin that extends into the bore when the hinged member is in a closed position, and, h) wherein the assembly plate has at least one first race and the hinged member has at least one second race and when the hinged member is in the closed position a slot is formed between the hinged member and assembly plate and the slot extends to the at least one first race and the at least one second race a parachute riser attachment component having a ball portion and a riser portion and when the hinged member is in the closed position the ball portion is positioned in the at least one first race and the at least one second race and the riser portion is positioned in the slot, and the parachute riser attachment component is connectable to the parachute, such that when the firing signal is sent to the firing circuit the at least one release pin is retracted from the bore and the hinged member moves to the open position to release the parachute riser attachment component.

7. A cargo parachute apparatus comprising for detaching the cargo from the parachute upon impact of the cargo with ground or water, the cargo parachute apparatus comprising:

a) a mechanical assembly attached to the cargo and releasably connected to the parachute, b) an electronic assembly including a sensor responsive to impact which provides a signal when impact of the cargo with the ground or water is detected and motive means and a circuit for activating the motive means to release the parachute in response to the signal from the sensor indicating impact of the cargo with the ground or water, c) wherein the mechanical assembly has an assembly plate connected to a hinged member and the assembly plate has a recess and a housing with a housing recess in the assembly plate and the housing recess extends to a stored energy device recess and a stored energy device positioned in the stored energy device recess, and wherein the stored energy device recess extends to an elongated passage that extends to release pin passages that lead to a bore in the housing, d) wherein at least one release pin is positioned in the bore and capable of moving in response to released energy such that the at least one release pin is retracted into the bore upon actuating the stored energy device, e) wherein the hinged member has at least one release pin receiving formation and the at least one release pin is positioned in the release pin receiving formation when the hinged member is in the closed position and, f) wherein the assembly plate has at least one first race and the hinged member has at least one second race and when the hinged member is in the closed position a slot is formed between the hinged member and assembly plate and the slot extends to the at least one first race and the at least one second race, a parachute riser attachment component having a ball portion and a riser portion and when the hinged member is in the closed position the ball portion is positioned in the at least one first race and the at least one second race and the riser portion is positioned in the slot, and the parachute riser attachment component is connectable to the parachute, and the electronic assembly includes a microprocessor for sending the signal to a firing circuit in order to actuate the motive means and retract the at least one release pin from the release pin receiving formation when impact is detected such that the hinged member moves to an open position to release the parachute riser attachment component to detach the parachute.

8. The cargo parachute apparatus according to claim 1 wherein the cargo includes a person.

9. The cargo parachute apparatus according to claim 1 wherein the cargo and the mechanical assembly remain attached after detachment of the parachute from the mechanical assembly.

10. The cargo parachute release apparatus according to claim 6 wherein the cargo includes a person.

11. The cargo parachute release apparatus according to claim 9 wherein the cargo includes a person.

12. A cargo parachute release apparatus for connecting a cargo and a parachute and for detaching the cargo from the parachute when the cargo impacts ground or water, the cargo parachute release apparatus comprising:
   a) a mechanical assembly for connecting to the parachute and the cargo,
   b) an electronic package assembly including a circuit assembly and the electronic package assembly is housed inside the mechanical assembly,
   c) the electronic package assembly includes a series of accelerometers for detecting three axis acceleration and a microprocessor such that the data generated by the accelerometers is capable of being sent to the microprocessor for processing, a strain gauge circuit for measuring the strain on the mechanical assembly and wherein the strain data is capable of being sent to the microprocessor, the microprocessor for processing the acceleration data and comparing the acceleration data to one or more predetermined stored impact signal parameters that indicate impact of the cargo with the ground or water,
   d) wherein the mechanical assembly has an assembly plate connected to a hinged member having at least one release pin receiving formation with a bore and the electronic package assembly has at least one release pin that extends into the bore when the hinged member is in a closed position,
   e) wherein the assembly plate has at least one first race and the hinged member has at least one second race and when the hinged member is in the closed position a slot is formed between the hinged member and assembly plate and the slot extends to the at least one first race and the at least one second race, a parachute riser attachment component having a ball portion and a riser portion and when the hinged member is in the closed position the ball portion is positioned in the at least one first race and the at least one second race and the riser portion is positioned in the slot, and the parachute riser attachment component is connectable to the parachute, and
   f) and the electronic package assembly includes a firing circuit and the microprocessor is capable of sending a firing signal to the firing circuit when at least one of the acceleration data and the strain data match the one or more predetermined stored signal parameters that indicate impact of the cargo with the ground or water in order to retract the at least one release pin from the bore such that the hinged member moves to an open position to release the parachute riser attachment component such that and wherein the mechanical assembly is detached from the parachute and the cargo is not dragged on the ground or water by the parachute after the cargo has impacted the ground or water.

13. A cargo parachute release apparatus for connecting a cargo and a parachute, the cargo parachute release apparatus comprising:
   a) a mechanical assembly for connecting to the parachute and the cargo,
   b) an electronic package assembly including a circuit assembly housed inside the mechanical assembly, a series of accelerometers for detecting three axis acceleration and sending acceleration data to a microprocessor, a strain gauge circuit for measuring the strain on the assembly plate and sending the data to the microprocessor, and the microprocessor for processing acceleration data and comparing the acceleration data to one or more predetermined stored impact signal parameters, and a firing circuit, wherein the microprocessor is capable of sending a firing signal to the firing circuit when at least one of acceleration data and the strain data match the one or more predetermined stored signal parameters to release the parachute from the mechanical assembly, and
   c) wherein the mechanical assembly has an assembly plate and a hinged member hinged to the assembly plate, the hinged member being movable between an open position and a closed position and the assembly plate has a recess and the electronic package assembly is positioned in the recess such that it is located between the hinged member and assembly plate when the hinged member is in the closed position,
   d) wherein the hinged member has at least one release pin receiving formation with a bore and the electronic assembly has at least one release pin and the release pin is positioned in the bore when the hinged member is in a closed position, and,
   e) wherein the assembly plate has at least one first race and the hinged member has at least one second race and when the hinged member is in the closed position a slot is formed between the hinged member and assembly plate and the slot extends to the at least one first race and the at least one second race a parachute riser attachment component having a ball portion and a riser portion and when the hinged member is in the closed position the ball portion is positioned in the at least one first race and the at least one second race and the riser portion is positioned in the slot, and the parachute riser attachment component is connectable to the parachute, and the microprocessor for sending the firing signal to the firing circuit in order to retract the at least one release pin from the bore such that the hinged member moves to the open position to release the parachute riser attachment component.

* * * * *

UNITED STATES PATENT AND TRADEMARK OFFICE
CERTIFICATE OF CORRECTION

PATENT NO.         : 7,461,817 B1
APPLICATION NO. : 11/471757
DATED              : December 9, 2008
INVENTOR(S)        : Hansson et al.

It is certified that error appears in the above-identified patent and that said Letters Patent is hereby corrected as shown below:

Title page, item (75), the residence of the first inventor, Mark G. Hansson, should read:

--Saint Petersburg, FL--.

Signed and Sealed this

Third Day of February, 2009

JOHN DOLL
*Acting Director of the United States Patent and Trademark Office*